12) United States Patent
Susnjar

(10) Patent No.: US 6,883,062 B2
(45) Date of Patent: Apr. 19, 2005

(54) HIGH-SPEED DISK DRIVE SYSTEM

(75) Inventor: Aleksandar Susnjar, 4003 Bayview Avenue Apartment 607, Toronto, Ontario (CA), M2M 3Z8

(73) Assignee: Aleksandar Susnjar, Markham (CA)

( * ) Notice: Subject to any disclaimer, the term of this patent is extended or adjusted under 35 U.S.C. 154(b) by 0 days.

(21) Appl. No.: 09/683,685

(22) Filed: Feb. 3, 2002

(65) Prior Publication Data

US 2003/0149834 A1 Aug. 7, 2003

(51) Int. Cl.$^7$ .............................................. G06F 12/00
(52) U.S. Cl. ................. 711/112; 360/78.05; 360/246.6; 360/246.7
(58) Field of Search ......................... 711/114, 111, 112; 714/6; 360/78.05, 246.6, 246.7

(56) References Cited

U.S. PATENT DOCUMENTS 6,496,899 B1 * 12/2002 DeMoney .................... 711/112

* cited by examiner

Primary Examiner—Kevin Verbrugge

(57) ABSTRACT

A high-speed disk drive system that features significant performance improvements over previously available systems. By immediately fetching the data as soon as heads reach the destination cylinder, internally stripping the data across the surfaces and plurality of read/write heads on every surface the data transfer speeds many times depending on other characteristics of the system. By implementing plurality of read/write heads and internal parity surfaces or distributed parity blocks/zones the system achieves higher reliability (fault resistance) with head and surface fail-over fail-safing.

11 Claims, 19 Drawing Sheets

HIGH-SPEED DISK DRIVE SYSTEM

BACKGROUND OF INVENTION

1. Technical Field

This invention relates to disk drive technology. More particularly, this invention relates to a very high-speed disk drive system with immediate fetching, internal data stripping and plurality of heads for every surface, improved command interface and improved reliability.

2. Description of the Prior Art

A hard disk drive is invented to serve as the high-capacity, high-speed, random-access secondary memory for computer systems. A computer system or any other type of host to a hard disk drive uses the same to store and retrieve chunks of data usually related to as 'sectors'. Sectors (usually the size of 512 bytes) are (by the data block definition) also the smallest addressable physical data unit of a hard disk drive. Furthermore, unlike the primary memory, a hard disk drive usually requires a substantial preparation (access) time before it is ready to actually read or record the data.

Hard disk drives are currently used to store operating systems, documents and other files, video and audio data—all large content that needs to be saved after the system is turned off or otherwise looses power. It is also used as the most optimal and inexpensive system for storing large amounts of data and achieving acceptable performance.

DESCRIPTION OF PRIOR ART PARTS

A prior-art hard disk drive system consists of the following (partially shown on FIG. 1):

Revolving disk(s) made of hard material capable of withstanding high speeds of rotation without substantial deformation and with the surface coating capable being used for data (presently magnetic) recording [also see FIG. 3]

Motor (mechanism) that rotates the disks—not shown

Actuator arms (head arms) with heads for every surface used, capable of being moved in any fashion (e.g. angular motion with voice coils or linear motion using other technologies) in order to position the heads at a particular distance from the center of disk rotation (cylinder) [also see FIG. 2].

Mechanism that moves the head arms [shown on FIG. 2]

Controller (Electronics, Software) that accepts commands and manages hard disk drive"s resources (components) accordingly, also containing some read/write buffer memory—not shown The interface (connectors) to the host system—not shown Wiring connecting all electrical components (motors, heads, head arm moving mechanisms, controller and the interface)—not shown Casing [shown as rectangle on FIG. 2]

OPERATION (PRIOR ART)

Disks (2: 2a, 2b, 2c . . . ) are revolving around a joint spindle. The axis of rotation (8) is shown on FIGS. 3–7. Every disk has two surfaces (3, i.e. disk 2a has surfaces 3a and 3b, disk 2b has surfaces 3c and 3d, etc) that may or may not contain data (particular recording technology is not a subject of this patent) [FIG. 3]. Some surfaces may contain (only or in part) servo control information.

Head arm (4) carries the read/write heads (5) [FIG. 2]. It positions heads to particular distance from the center of disk revolution, to allow the heads to write or read data stored at that particular radius 9. The circles heads "pass" (when they do not move themselves) on a single surface while disks are revolving is called a track (11, i.e. one such track of surface 3c is marked as 11c on FIG. 5). A set of said tracks on all surfaces (same radius) form a cylinder 10 (a track is identified by the cylinder and a surface) [example shown on FIG. 4]. Each cylinder (and, thus, track) is angularly divided into a number of sectors (12). FIG. 6 shows one such sector. The term sector is not strictly defined and is used to describe any of the following: an angular portion of the disk system (all surfaces), an angular portion of only one surface in only one zone (described later), a data block size unit or a data block itself. Unless otherwise noted, the term sector will be used for any of these meanings. When such use would introduce ambiguity, this document will use the term cylinder sector to denote an angular part (12) of a complete cylinder (10), the term track sector (13) to denote an angular part of a single track (11), the term zone sector (12) to denote an angular part of a single zone (16, described later), the term data sector (12) to denote a chunk of data and the term unit sector to denote the size (unit) of a single data sector.

Some hard disk drive systems also implement the division of disk surfaces into zones (16). One such zone is shown on FIG. 7. Zones are used to maintain the linear data density by varying number of cylinder sectors in zones depending on the radius of the zone outer zones have more cylinder sectors than inner zones. Since disks have constant angular speed, not linear, this also implies that data transfer rates are greater in outer than in inner zones.

Controller (electronic and software components) control disk revolution, head arm (4) movement (7) and read/write operation of heads (5). For a read or write operation to happen, the controller brings the heads onto the cylinder (this is called seeking) containing the data to be read or the data sectors that need to be overwritten. This is done by moving the head arm (4) as shown by an arc with arrowheads (7) on FIG. 2. Then, controller waits for the disk revolution to bring the needed sector (12) to the heads. The average duration of this wait (rotational latency) is approximately one half-revolution period. Once the sector (12) reaches the heads (5), the head (5a, 5b, 5c . . . ) corresponding to the addressed surface (3a, 3b, 3c . . . ) is used to perform the read or write operation.

The controller usually has a read-ahead buffer (cache) where it can store the data read or the data assumed to be read next. Particular implementations of this read-ahead technology used in prior-art hard drives are not part of this invention.

There are many existing patents related to hard disk drive technology. U.S. Pat. Nos. 6,005,747 and 6,057,990 by Gilovich are most similar to this one; however although Gilovich describes the drives with multiple actuator systems, his inventions are focused on technology of actuators themselves and do not describe the logical operation (behavior) of such system, nor it suggests the possibility of simultaneously working with all heads on the same actuator arm.

PREVIOUS IMPROVEMENTS

Previous improvements of the hard disk drive system were directed towards all of the components of the system independently. Specifically, the following improvements were made:

Casing (1). Initially hard drives were removable storage memory. They evolved to the "fixed disk" system allowing more precise alignment, cleanness, balance, and more Controller. Initially hard disk drives had only the most basic circuitry and the controllers came as separate units capable of handling various hard disk drives. Presently more intelligence is moved to the circuitry on the hard disk drive itself, requiring only the basic communication protocol to be implemented externally. At the same time, the software containing the "intelligence" of the hard disk drive is improved. Buffer memory size has been increased from none to significantly large buffers in high-end drives.

Hard disk drive driving/rotating mechanism (motors) presently achieve faster acceleration and higher rotational speeds than before.

Head arm (4) driving mechanism (6) achieving faster head movement speeds and, thus, shorter access times.

Heads (5). Initially the same coil-based head performed both read and write operations. Presently there are separate read (i.e. magneto-resistive) and write heads featuring additional technologies and materials in order to achieve higher data densities and the capability of higher signal frequencies. Unless otherwise noted the term "head" will be used throughout this document to either to denote either a single head capable of being used for both reading and writing or a pair of read/write parts (also called heads in prior art).

The materials of which hard disks are made and coated, allowing higher data density and better thermal and other characteristics.

Small alterations of cylinder/track shapes resembling partial spiral structures allowing better performance in long sequential data reads and writes.

Internal data reorganization with interleaving and sector shifting (to compensate for the time lost during track-to-track head movement).

Recording technologies—the way information is translated to electrical signals and magnetic recordings and vice versa.

Overall communication protocols, allowing features like command queuing and reordering.

IMPLICATIONS OF PRIOR ART

Present design of hard drives has the following implications:

The only way to increase the speed of accessing particular cylinder is to make the actuator (head arm driving/movement) mechanism (6) faster.

The only ways to increase the raw data transfer speed is by increasing the recording density and increasing the disk rotation speed. This, in turn complicates the head (5) technology because of higher signal frequencies. When a single head (5a, 5b, 5c . . . ) fails, whole hard drive becomes inoperative. Depending on particular design it is usually not possible to perform the verifying reads after writes without waiting for one complete revolution to occur.

Read-ahead algorithms do not account for backward and otherwise unexpected reading even if the data may have been reachable easily. For example, when reading data backwards most drives accomplish slow transfer rates measuring few tens of kilobytes per second! Backward reads do not frequently occur for longer periods of time, but often occur as a part of random data accessing.

SUMMARY OF INVENTION

A disk drive that implements improvements that are parts of this invention in its full would achieve many times better performance in both speed and reliability terms. The improvements are based on improving and/or multiplying a number of otherwise standard components of every prior-art disk drive (integrated controller software and hardware and the head system) and solutions to problems that prevented this from being implemented before.

By implementing internal data stripping and multiple heads per surface significant increases of data transfer rate (speed) is achieved. This also allows improved data reliability when a portion of total disk drive capacity is allocated for parity (or other control) information that can be used to regenerate damaged data based on other related data (such as other parts of stripped data sector) and that information by doing simple calculations. The invention also relates to the improvement of the command/communication interface (improved command queuing and full-duplex communication) allowing it to fully unleash the power of other improvements suggested by this invention.

Because it does not require new command interfaces (although it could make use of them) the invention allows the compatibility with existing standards to be kept. Particular hard disk drive systems could benefit from this invention just by replacing the integrated controller software and hardware, making it easy to start with the production of new generation hard disk drives.

Although the invention most closely relates to prior art magnetic hard disk drives, it is applicable to any other disk-based memory drive, regardless of particular recording type (e.g. optical, holographic, electrostatic or other), regardless of number of disks and surfaces (some improvements can be used to improve the performance of even single-surface disk drives as well) and regardless of whether data is organized into cylinders, spirals or otherwise.

DETAILED DESCRIPTION

Figure 1:
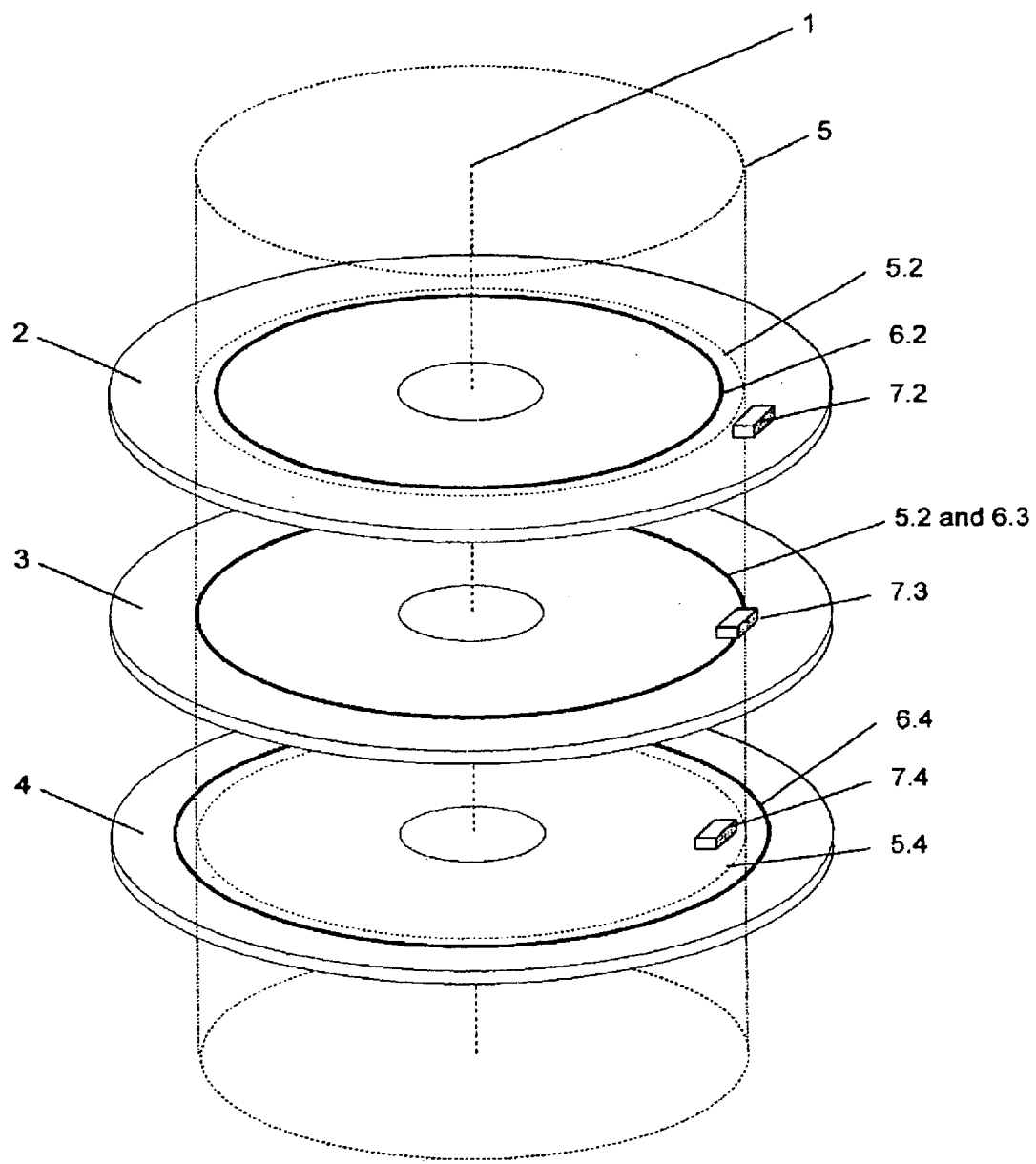
FIG. 1 is indicates main parts of prior-art hard disk drive system discussed in this invention, with the mechanical assembly constructed according to the prior art.
Figure 2:
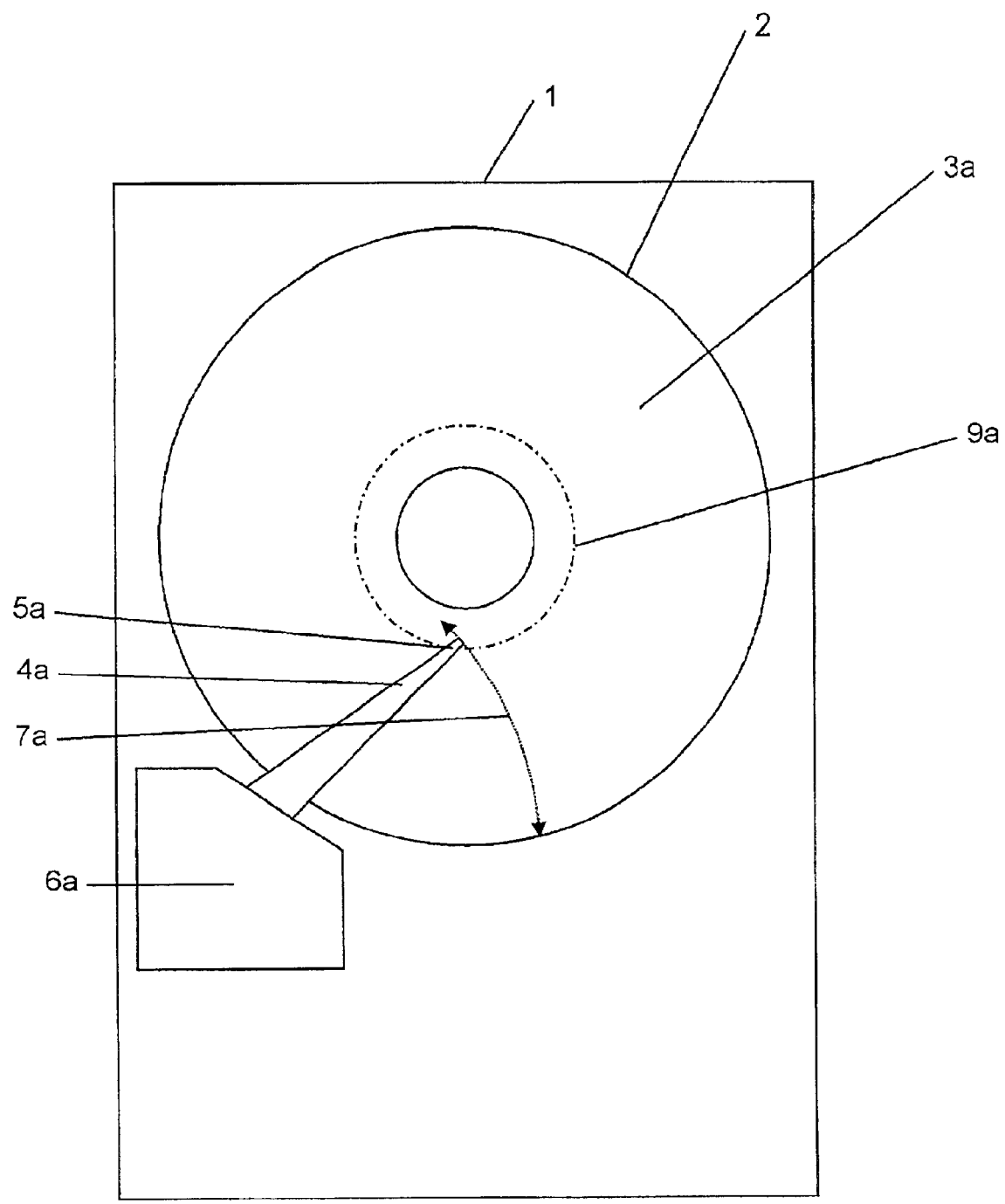
FIG. 2 indicates the internal layout of a prior art hard disk drive system viewed from the top. The dot-dashed circle (9a) indicates the radius where the heads are currently on. The arc with arrows (7a) on ends indicates the head (5) movement path. The surrounding rectangle (1) indicates the approximate relative size of the casing of currently most common (prior-art) hard disk drive systems.
Figure 3:
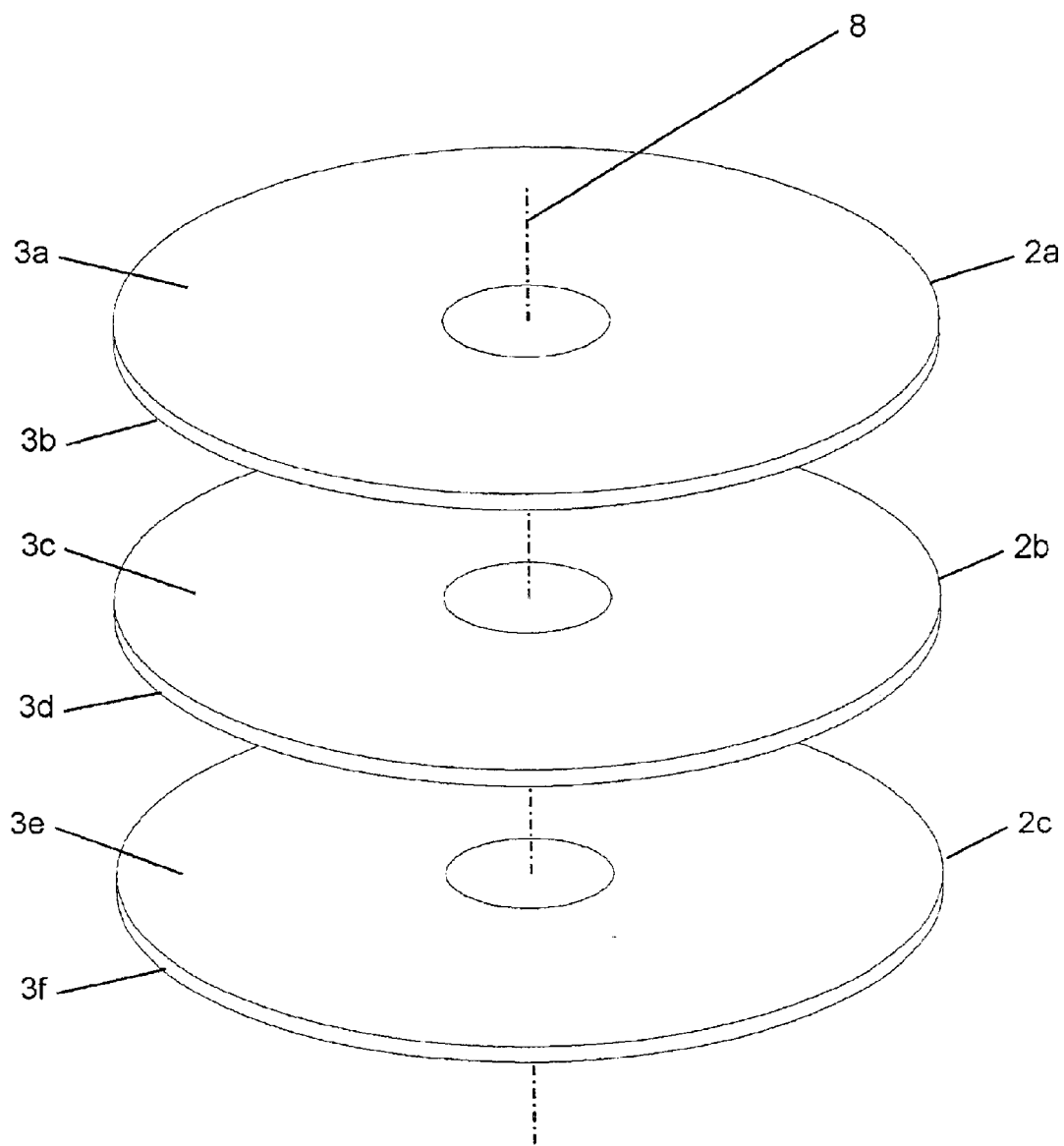
FIG. 3 shows three disks (2: 2a, 2b and 2c) having six surfaces (3a, 3b, 3c, 3d, 3e and 3f). The distance between disks is intentionally exaggerated to allow more details to be shown on following drawings while keeping the same template.
Figure 4:
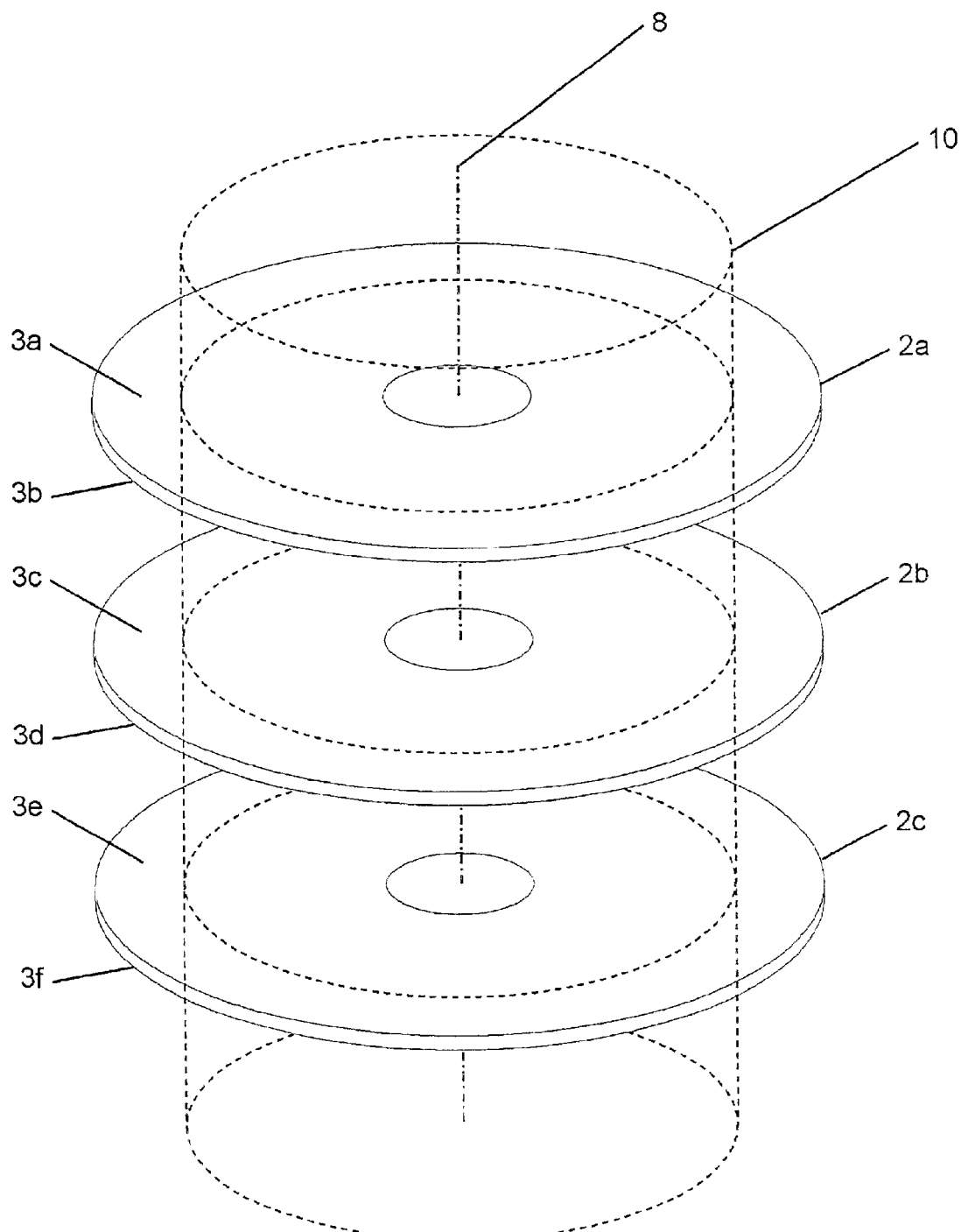
FIG. 4 indicates one cylinder 10 on three disks 2a, 2b and 2c (having six surfaces 3a, 3b, 3c, 3d, 3e and 3f).
Figure 5:
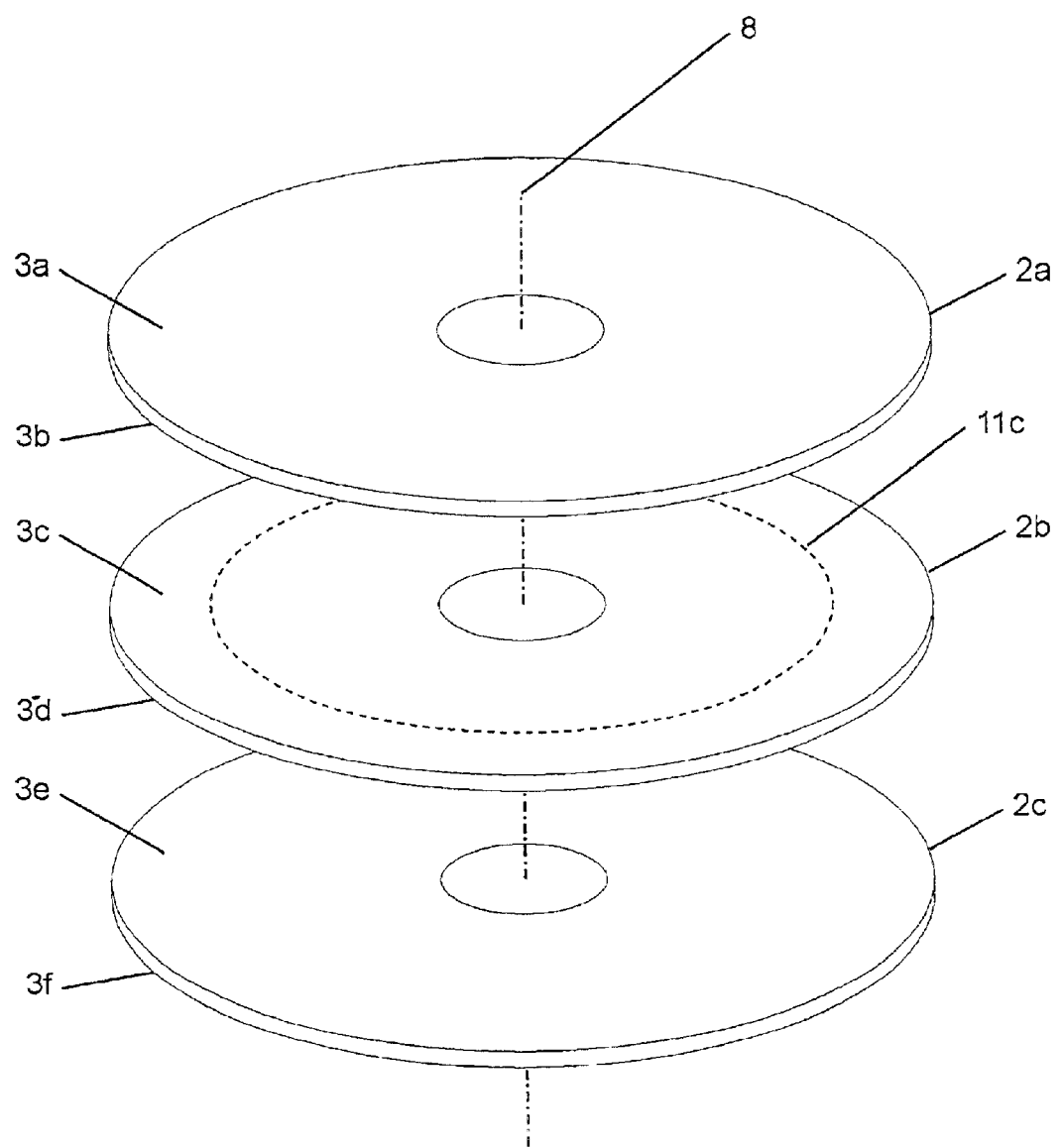
FIG. 5 indicates track 11c, precisely the one on the upper surface (3c) of the middle disk (2b).
Figure 6:
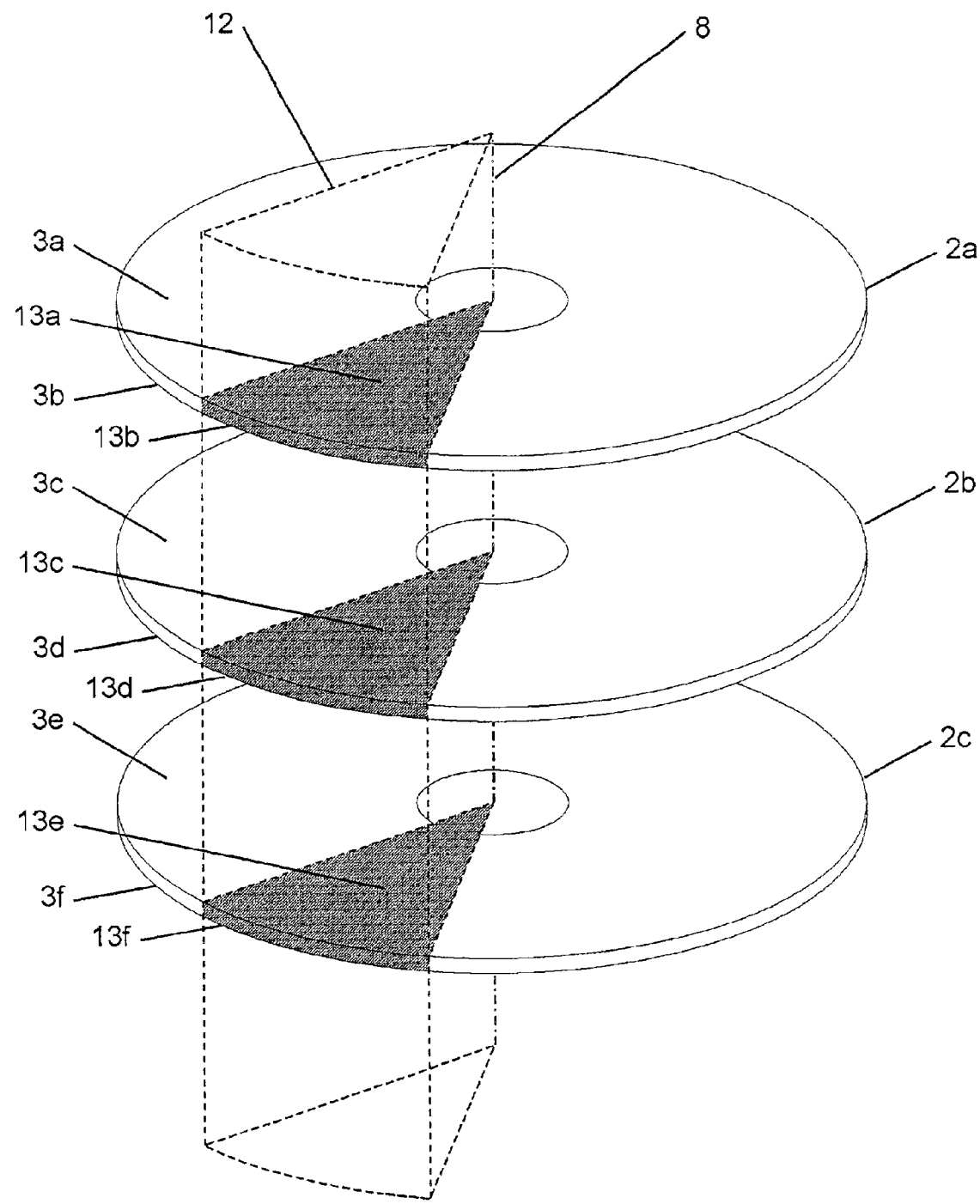
FIG. 6 shows the angular division of disks sectors by showing one such sector shaded (12) comprising of six surface sectors (13a, 13b, 13c, 13d, 13e and 13f); for simplicity, the Figure is applicable to disks with constant number of sectors only.
Figure 7:
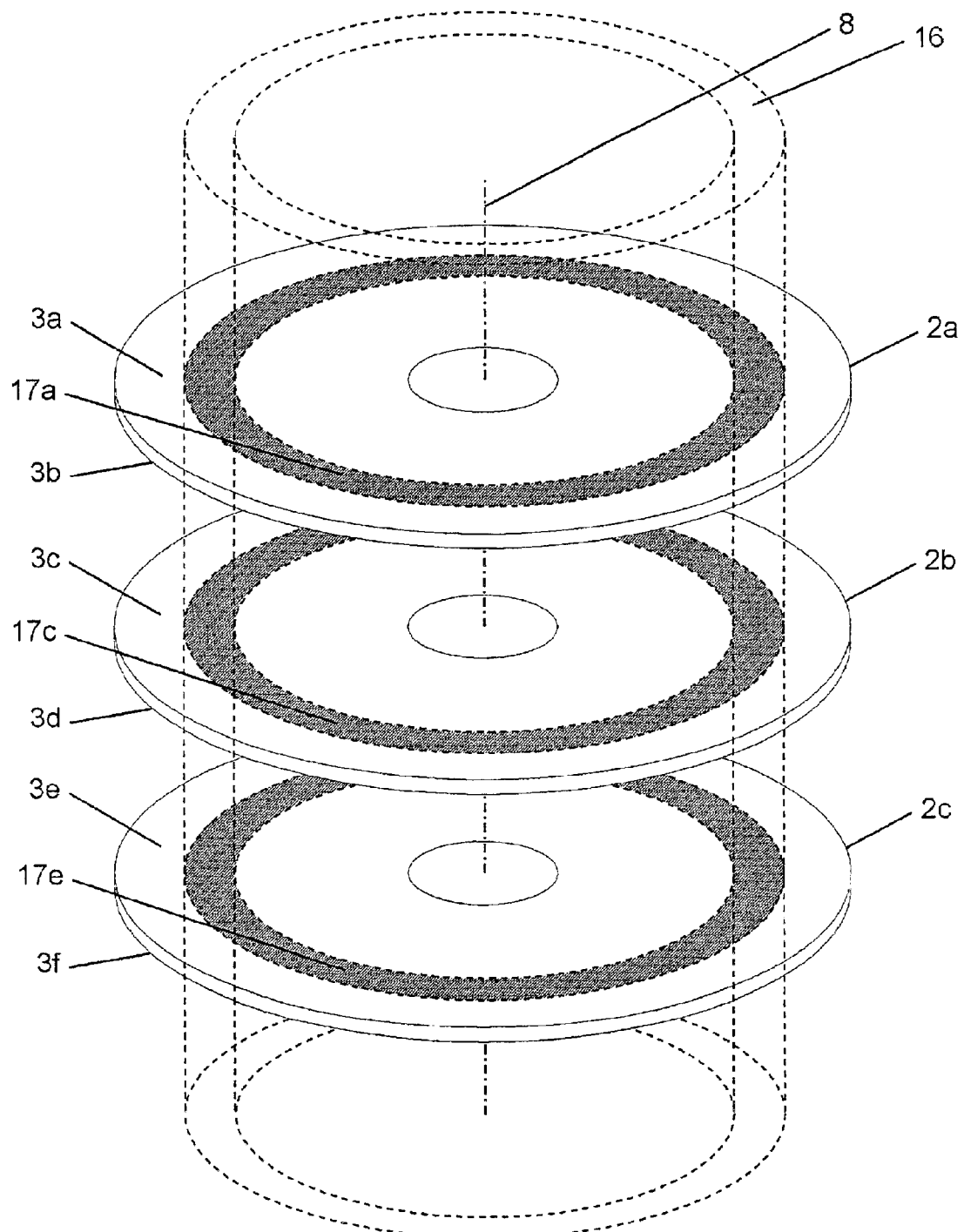
FIG. 7 shows the radial division of disks zones by showing one such zone (16) shaded.

This invention consists of a number of improvements over the prior art: "Immediate Fetching" (mainly a controller's software improvement), "Internal Stripping" and "Multiple Heads Per Surface". These improvements can be applied to prior-art hard drive systems either selectively or combined in part or in full. The invention is separated into these parts to allow for a transitional phase during which new disk drive systems may be manufactured implementing only some of said parts of this invention. For example, the first part of the invention may be manufactured to market by only modifying controller firmware and possibly adding more buffer (cache) memory. Then, internal data stripping and suggested reliability improvement can be applied to existing mechanical parts by replacing only the controller. After this period, more complicated mechanical changes can be applied implementing particular variations of this invention in full.

There are many possible embodiments and implications of the improvements described, opening up a huge possibility for increased disk drive system and data reliability. This reliability improvement is not described separately but as a part of other improvements. The preferred embodiment of the invention implements all suggested improvements related to the speed performance and suggested fail-over mechanisms, but not including the internal data organization with parity/control surfaces/zones/blocks suggestion related to reliability improvement. Alternate preferred embodiment implements all the improvements suggested by the invention, including the internal data organization with parity/control surfaces/blocks/zones improving the reliability of the disk drive system.

Immediate Fetching

What Prior-Art Systems are Lacking

After reaching a cylinder, prior-art controllers simply wait for the desired sector to come to the heads and then activate the reading and read-ahead process. The data that passes by the head prior to that moment is not being read, although it could be.

Improvement

Extra immediate fetching buffer should be used to receive the data read as soon as the head (5) reaches the cylinder (10), whether immediately needed or not. When read, write or seek command that requires head movement (7) is issued to the disk drive system (controller), the disk drive system should perform and complete the usual prior-art head movement process. Immediately after the seek is completed the controller logic will wait for first available/coming beginning of sector (13) and start reading the upcoming data whether it was addressed by the command or not. This immediate fetching process will be completed once the content of the entire cylinder (10) (or alternatively only a particular track 11) has been read. In case of "read" command the process of sending data back to the host can start as soon as first standalone chunk (i.e. data sector) of data has been fully read. In case of write operation, the process of reading upcoming data will be replaced with recording the data received from the host for data sectors addressed by the said write command. This data will also be put in the internal buffer as if it were read from the disks.

Implications

Requires larger, at least one cylinder (or alternatively, one track) worth buffer memory in addition to read-ahead, cache and other memory otherwise used by the disk drive system Significantly increases the speed of backward reads Increases the speed of random reads within one cylinder (or one track when the alternative embodiment is used with only one track worth of immediate fetching)

Frees the hard drive mechanics for new command earlier by having all required data on average on half-revolution before (because last data would already be in the buffers)

Generally does not improve the performance of long sequential reads found in multimedia applications Does not improve the performance of write operations Internal Data Stripping and Improved Reliability What Prior-Art Systems are Lacking Even though the mechanics and head circuitry exists for every used disk surface (3), only one head (5) is accessed at a time (not counting servo control surfaces, if any). Reading or writing one complete cylinder requires as many revolutions as many data surfaces the drive has.

Main reasons for this were:

inability to have all heads (5) positioned at the same logical cylinder (10) because of small but significant disk deformations resulting in slightly different physical radiuses (9) of various tracks of the same cylinder; and imprecise relative head (5) alignment causing different heads (for different surfaces 3) to be positioned at different cylinders (10).

Improvement

Extend the controller circuitry to be able to handle all available heads (5) at the same time and, at the same time, reorganize the data such that it is stripped across all the surfaces (3), as in:

Data sector level stripping: stripping every one-sector worth of track/data into as many parts as many surfaces there are. For a disk drive system with D disks and S=2D surfaces out of which Sc surfaces are being used for servo (at any given cylinder or cylinder sector 12) and parity/control information (usually none or one) there are Sd=S−Sc data surfaces. Therefore every data sector would be split into 512/Sd byte (rounded-up) strips distributed across data surfaces but all in one cylinder sector. Decomposition of data sector into strips and re-composition of strips is especially easy in cases when Sd is a positive integer power of two ($2^n$, n∈N, which is true for disk drives with one, two and four disks, for example). In other words, this stripping method distributes data sector strips (segments) across data surfaces (3) of corresponding cylinder sector (12).

Atomic information "piece" stripping: treating all data surfaces at the same time, therefore stripping the data down to the smallest recordable piece of information (this relies on extremely precise mechanics that keeps the same signal alignment across surfaces by being resistant or tolerant to thermal and other changes). In other words, this stripping method distributes data sector recording tokens across data surfaces of corresponding cylinder sector.

Figure 18:
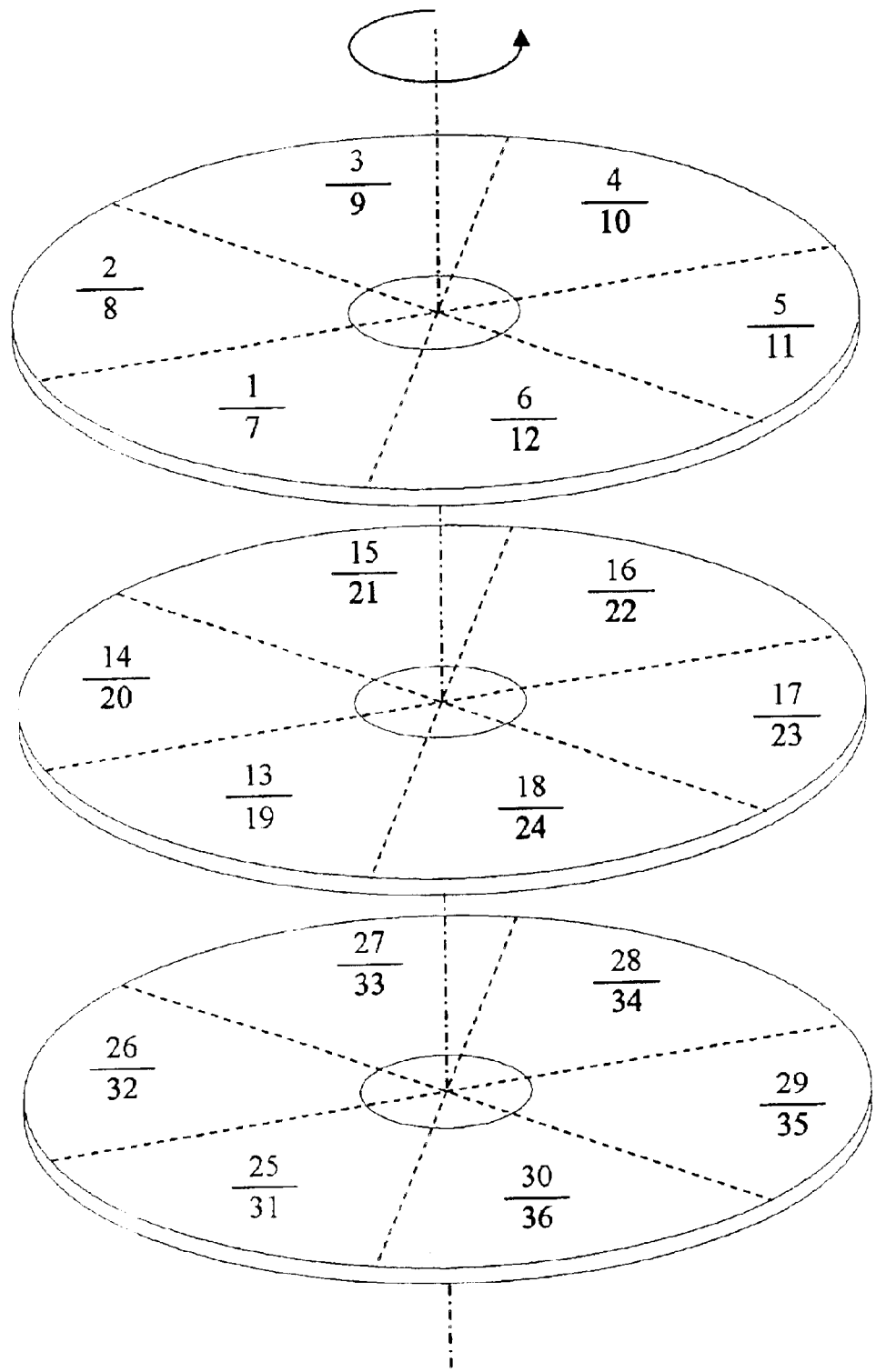
FIG. 18 shows prior-art (currently used) ordering of sectors of one cylinder within tracks and across surfaces.
Figure 19:
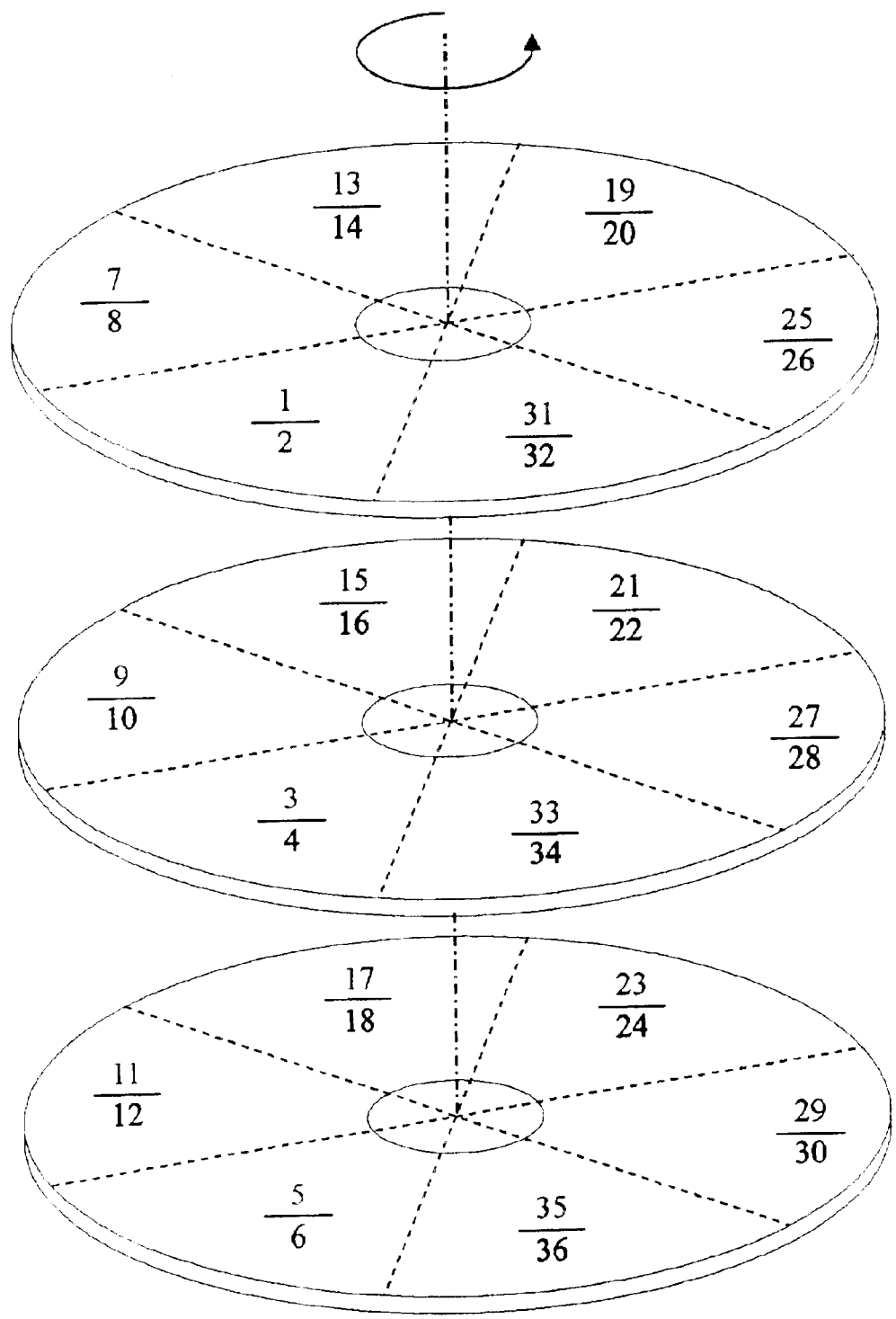
FIG. 19 shows an improved ordering of sectors of one cylinder across surfaces and within tracks (applicable when internal data stripping improvement is used)

Cylinder-level stripping: leaving data sectors as a whole. Normally, the data sectors (13) are ordered sequentially within a track 11 (ordered by some function of angle) and continued on the next surface (3) after every track-worth of sectors and then on next cylinder 10 (example of such ordering of sectors within one cylinder is shown on FIG. 18 sector numbers are shown in "doubles" in which upper number shows the number of the upper-surface sector of the disk and the lower number shows the number of the corresponding lower-surface sector of the same disk). Instead of this, to effectively utilize parallel reading from all heads (5), data sectors should be ordered across surfaces 3 (heads 5) first, not inside tracks (11). The sequence would be continued to the next (angular) cylinder sector (12), then next cylinder (10). The example of this (ordering of sectors within one cylinder) is shown on FIG. 19 (same sector numbering notation is used as in FIG. 18). To achieve higher speeds, this improvement also requires the disk drive system to operate with all heads simultaneously.

In one embodiment, the controller reads the data from all surfaces (3) simultaneously and re-composes said data as necessary, effectively implementing the drive's internal stripping similar and analogous to what RAID (Redundant Array Of Inexpensive Disks) Level 0 does externally and across multiple hard disk drives. Writing (recording) data operation follows the same model and is also simultaneous.

The second embodiment operates the same way as the said first preferred embodiment but improves the data reliability by allocating certain surface 3a, 3b, ... (or surfaces) or zones across multiple surfaces for parity or other type of control information allowing full data recovery when one or more pieces of recorder information is unavailable for whatever reason (i.e. surface damage or head failure). This is similar to what RAID (Redundant Array Of Inexpensive Disks) Level 3, 4, 5, 6 or 7 achieve by distributing this information across multiple disk drives. During write operation, parity (or other control) information has to be calculated and recorder simultaneously with raw data. Read operation requires all the data (including the parity/control data) to be read; if any one of the parts of the raw data is bad or inaccessible it can be regenerated from other parts and the control data.

This reliability improvement stores control information and handles error situations internally, thus removing the need for special, costly, RAID controllers for the sole purpose of data reliability. It is generally less expensive to implement this improvement internally to the disk drive rather than externally (with array of drives) because less advanced synchronization and control logic is required. This improvement somewhat reduces the usable capacity and speed performance but significantly improves the data reliability. Therefore, this embodiment is recommended in situations when data reliability is more important than speed and capacity. In third embodiment, disk drive controller logic can also support a command for configuring the drive to operate in either one of two modes the faster mode (not using suggested reliability improvement) and more reliable mode (using suggested reliability improvement), thus enabling the end-user or client to choose which configuration is better for him/her/them/it.

Major issue with realizing the technology that allows the data to be read from all heads at the same time is that all heads (5) are mounted on the same actuator drive system (6) and, therefore, cannot be independently moved. This is a problem because at current track densities all heads need not to be positioned on the same cylinder (10) on all surfaces (3) due to thermal and otherwise caused deformations of disks" (2) surfaces (3) and relative misalignment of heads (5). Implementing separate actuator/drive system (6) for each head (5) would be at the very least cumbersome, expensive and would have much greater space requirements with current technology (although this is also possible to achieve and is explained later).

The invention described here comprises of (among other things) one possible solution to this problem: introduction of separate fine-movement mechanisms for each head. These mechanisms would be mounted on main actuator arms and would provide separate "fine-tuning" of position of each head. This mechanism has to be light (to minimize the impact on main actuator strain and resulting speed), has to be at least as fast as the main actuator, at least as precise as the main actuator, and has to be mechanically simple (to maximize the reliability while being in constant motion with actuator arms). The amplitude (range) of movement needs not to be as large as that of the main actuator. Instead, it only needs to provide enough range to cover for small cylinder position (radius) differences between heads (surfaces).

Figure 17:
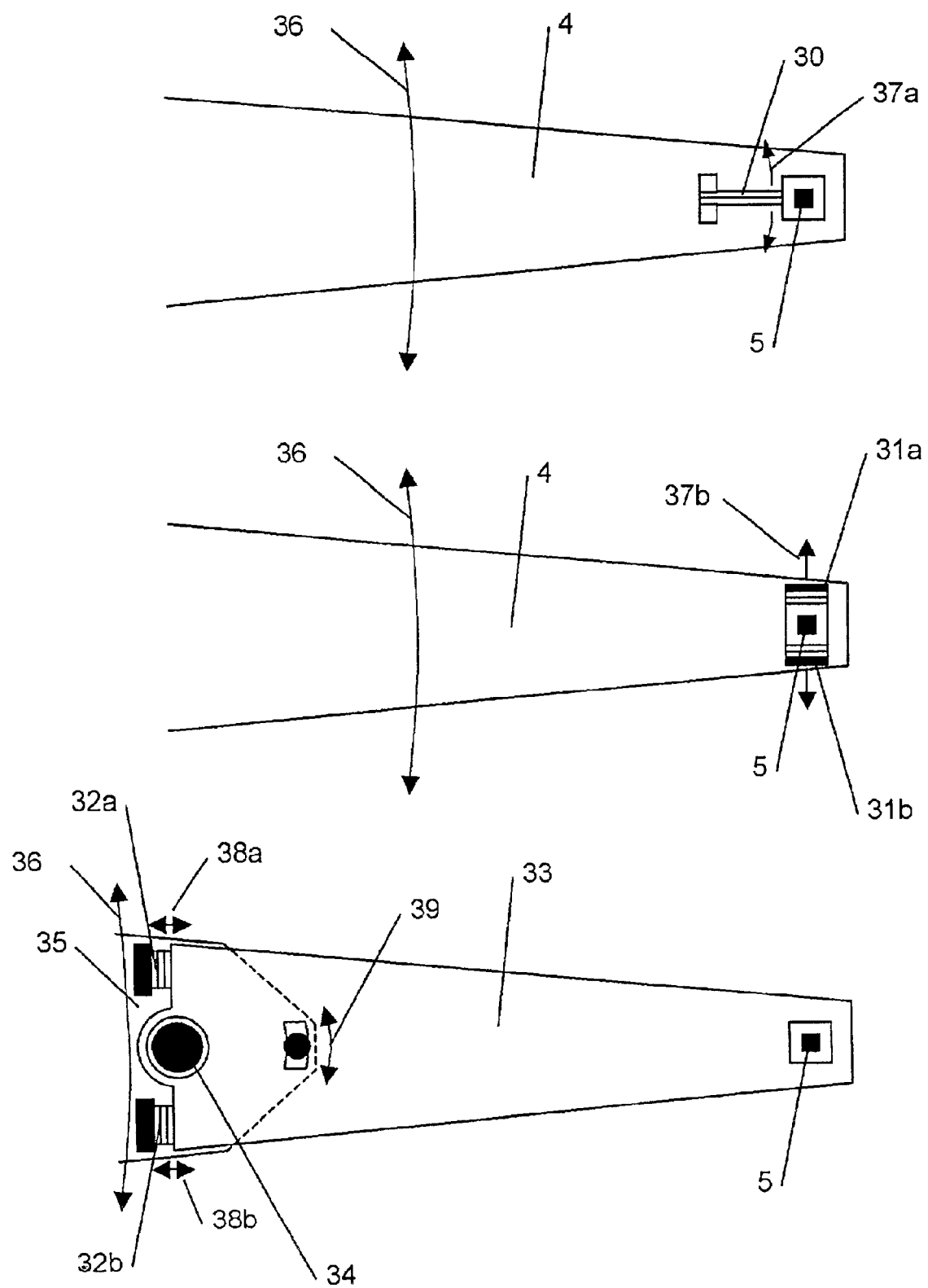
FIG. 17 shows some examples of possible implementations of mechanisms for fine-tuning the position of each head on the carriage separately by means of using piezo-electric crystals. The drawing does not go into details of making the carriage lighter the only purpose of it is to present possible placements of piezo-electric movement elements.

A number of possible embodiments of these head fine-positioning mechanism can be implemented using piezo-electric effect, as shown on FIG. 17. While main actuator arms (4) move along the path 36, positioning all the heads (5) to the approximate proximity of the desired cylinder, fine-tuning mechanisms (30, 31 and/or 32) are used to finally bring (position) the head precisely on the target cylinder by moving it along the path 37. Three possible implementations are shown on FIG. 17:

angular-moving (path is marked as 37a) mechanism 30 at the tip of the arm, using two pieces of piezo-electric material bonded together so that differential changes in length of the two pieces produce movement;

linear-moving (path is marked as 37b) mechanism 31 comprising of two piezo-electric elements (31a and 31b) set up so that one "pulls" the head 4 while another is "pushing" it and vice versa; and a mechanism 32 installed at the base of each arm (35), actually moving the whole remaining arm extension 33 around some axis (34) along the path 39 (in addition to main movement along the path 36), comprising of (in this example) two piezo-electric elements (32a and 32b) set up so that one "pulls" the arm extension 33 while another one is "pushing" it and vice versa, resulting in extra rotating motion Implications More circuitry, faster logic required Very little or no mechanical changes to main parts, but requires mechanisms for fine-tuning the position of each head separately.

Raw sequential data transfer speed is increased as many times as many data surfaces the drive has (e.g. if a regular six data surfaces hard drive achieves 20 MB/s transfer at specific cylinder, it would have the transfer rate of 120 MB/s after this change). Compared to prior-art hard disk drive systems (without internal data stripping), the speed improvement is equivalent to rotational speed increased as many times as many data surfaces the drive contains. Most significant performance gain is for multimedia applications i.e. audio and video editing.

New, faster, disk drive communication interfaces may be required to allow new transfer speeds Even without fast communication interfaces the drive would behave much faster if it supports command queuing, because it would have more time to move head arms (there would be less wasted idle time)

It would appear that disk drives have only one surface and there would be no difference between logical tracks and cylinders. At the same time it would appear that there are many more logical sectors per logical track/cylinder Improved data reliability in some embodiments Multiple Read/Write Heads For Every Surface What Prior-Art Systems are Lacking Aside from internal data stripping improvement mentioned above, further performance improvement using prior art would require increasing the speed of rotation, increasing the recording data density (and that results in higher signal frequencies) or increasing the speed of head (5) arm (4) movement (7), all of which would bring only slight improvements.

Suggested Improvement

Implementation of multiple heads (5) per surface (3) [some possible embodiment layouts are presented on FIGS. 8–16] can address the described performance bottleneck and further increase the performance improvement achieved by internal data stripping. There are many possible modes of operation of this technology, some of which are described below. Note that modes described are not exclusive and can be combined and even selected on command or automatically during regular operation of such systems.

Mode 1—All Heads On Same Cylinder

Figure 8:
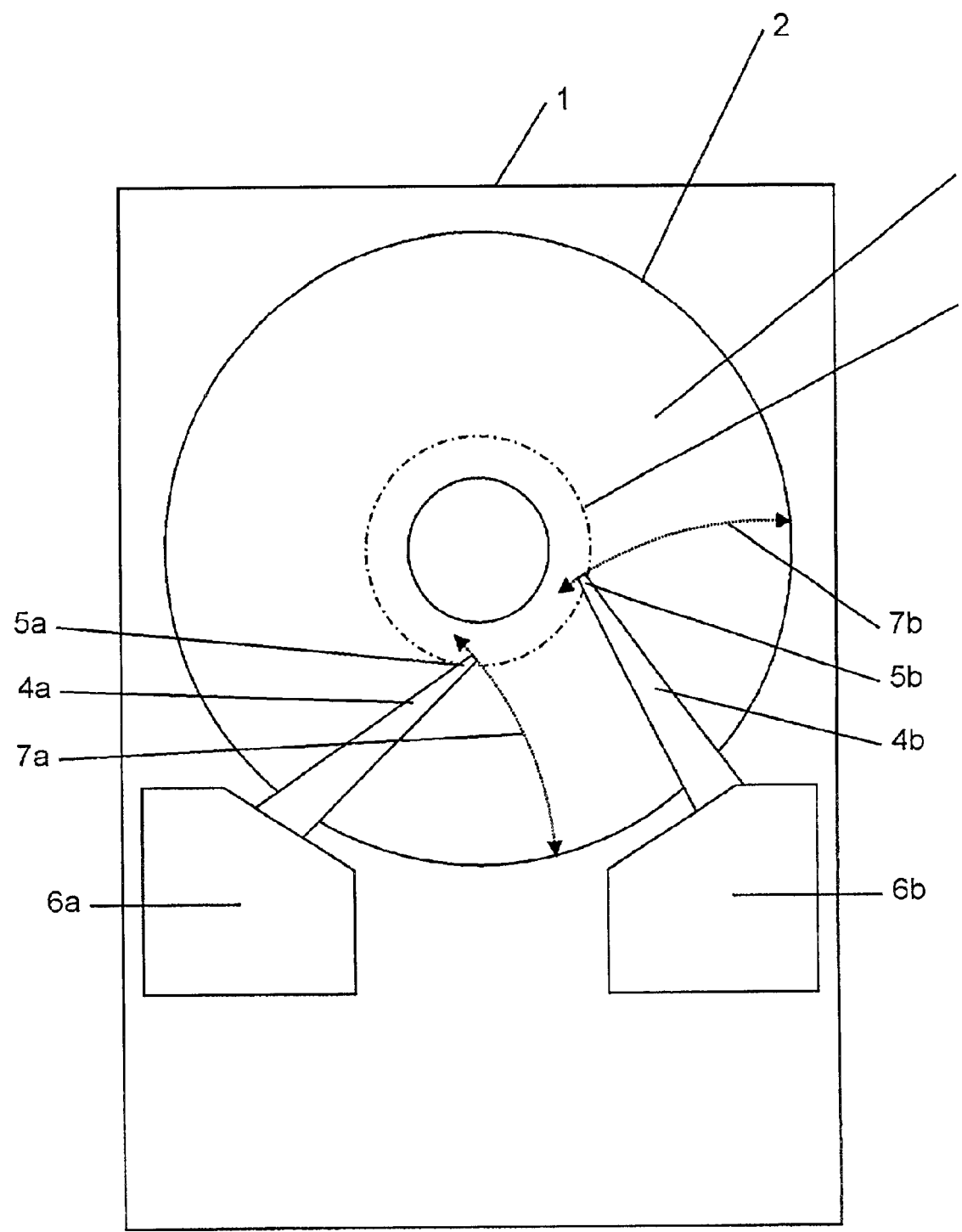
FIG. 8 shows one possible (but not preferred) arrangement of improved disk drive system with two head arm sets (6a+4a and 6b+4b) that are limited (by any means) to having all heads on the same cylinder. The dot-dashed circle 9a indicates the radius where the heads are currently on. The arcs with arrows on ends (7a and 7b) indicate the movement path of corresponding heads (5a and 5b). The surrounding rectangle (1) indicates the approximate relative size of the casing of currently most common (prior-art) hard disk drive systems.
Figure 9:
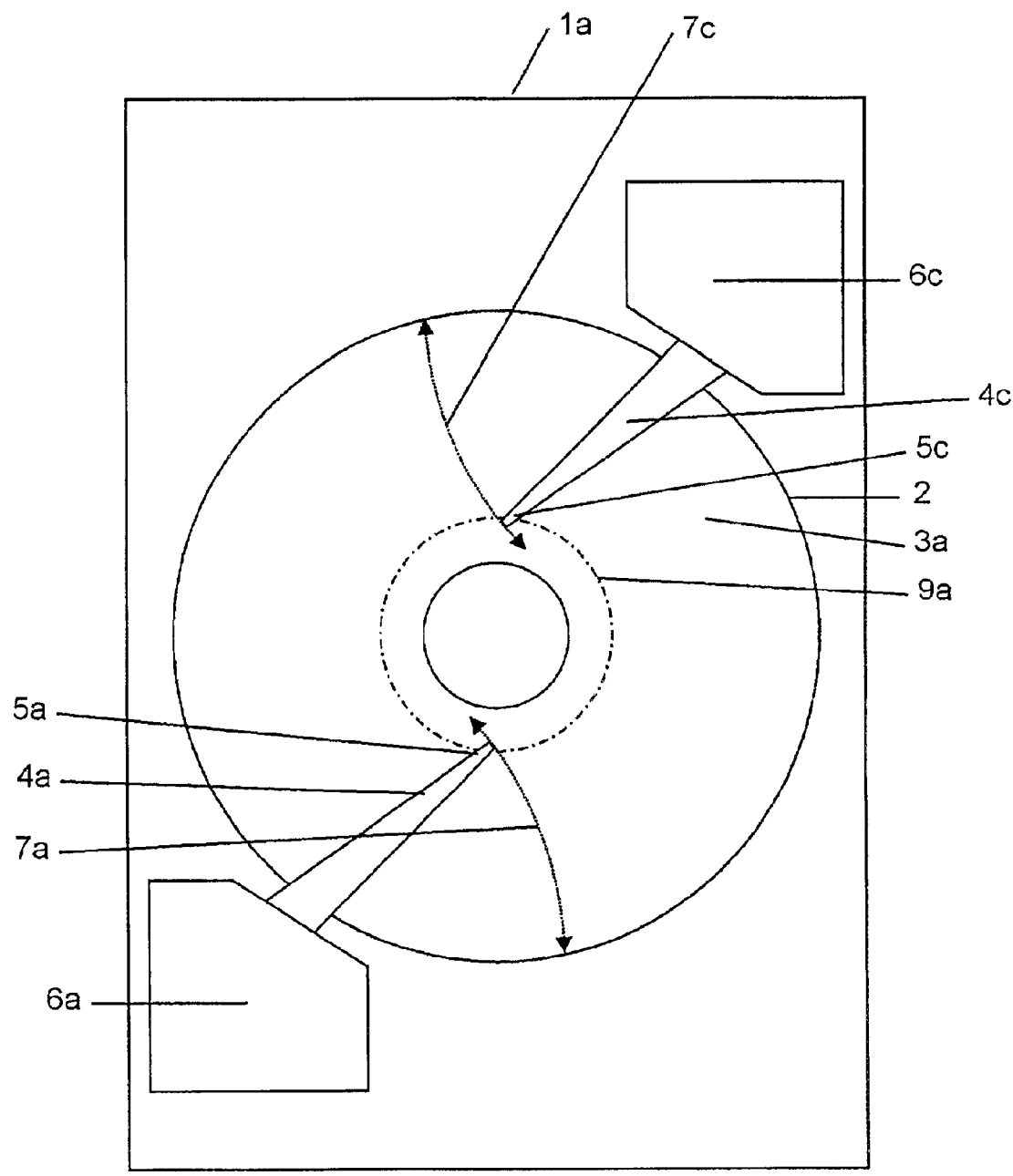
FIG. 9 shows a preferred arrangement of improved disk drive system with two head arm sets (6a+4a and 6c+4c) that are limited (by any means) to having all heads (5a and 5c) on the same cylinder. The dot-dashed circle indicates the radius (9a) where the heads are currently on. The arcs with arrows on ends (7a and 7c) indicate the movement path of corresponding heads (5a and 5c). The surrounding rectangle (1) indicates the approximate relative size of the casing of currently most common (prior-art) hard disk drive systems.
Figure 10:
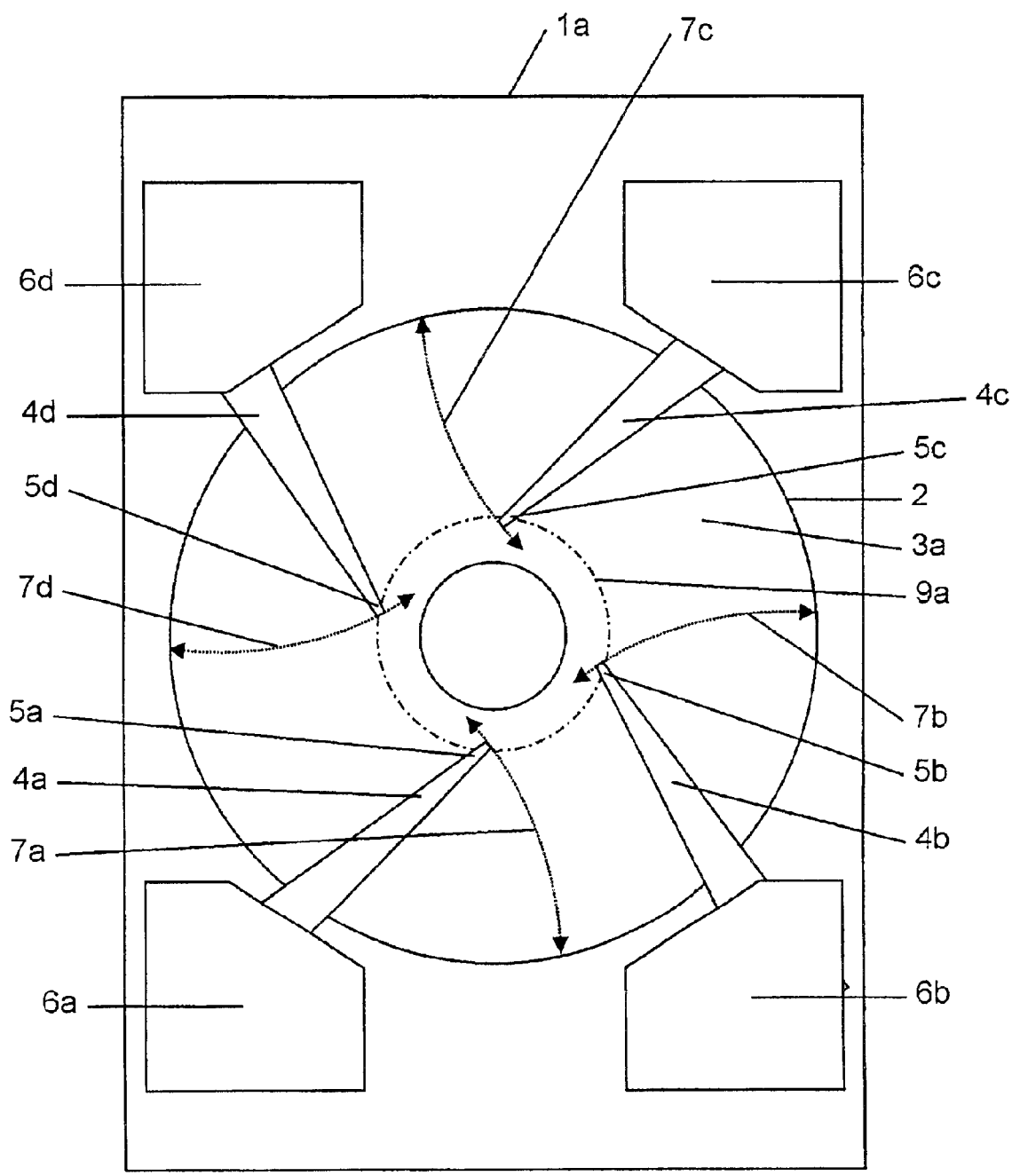
FIG. 10 shows a preferred arrangement of improved disk drive system with four head arm sets (6a+4a, 6b+4b, 6c+4c and 6d+4d) that are limited (by any means) to having all heads (5a, 5b, 5c and 5d) on the same cylinder. The dot-dashed circle indicates the radius (9a) where the heads are currently on. The arcs with arrows on ends (7a, 7b, 7c and 7d) indicate the movement path of corresponding heads (5a, 5b, 5c and 5d). The surrounding rectangle (1) indicates the approximate relative size of the casing of currently most common (prior-art) hard disk drive systems.

Having multiple head arms (4) sharing the same controller and/or actuator in such manner that all the actuators always position their heads (5) over the same cylinder (10), but at different angles [shown on FIGS. 8–10], is effectively an extension of the internal stripping technology. Introduction of N such evenly angularly distributed head arms would result in N times faster reads of whole cylinders. This reduces the average one-half rotation latency (waiting for a particular sector to come to the heads) to 1/(2N) and would reduce the minimum time required to read the whole cylinder from 1 revolution to 1/N revolutions. This improvement, however, does not address the problem of cylinder access ("seek") speed. Multimedia (audio/video) applications can benefit with transfer speeds increased as many times as many head arms are used in the drive. Combined with internal stripping, the maximum speed increase is N*S times where N is the number of actuators and M is the number of surfaces.

In the preferred "All Heads On Same Cylinder" embodiment of disk drive system, the heads are always evenly angularly distributed [FIGS. 9 and 10]. Although not mandatory, positioning the heads evenly simplifies the work required from the controller and implies the most significant speed performance increase. This is because maximum time required to read a track (or a complete cylinder if internal data stripping is implemented) is equal to the largest angle between heads divided by the angular speed of disk rotation and evenly distribution minimizes that maximum angular distance. To achieve constant even angular distribution of heads, either linear head arm movement [FIGS. 14–16]or appropriately positioned and directed radial head arm movement (i.e. as shown FIG. 9) could be used. In this case, such disk drive system compared to normal (previous) hard disk drive systems without this improvement; the speed improvement over prior-art systems is equivalent to rotational speed increased as many times as many data surfaces the drive contains.

A variation of "Internal Data Stripping" improvement can be implemented when combined with "All Heads On Same Cylinder" improvement in case when no fine-tuning head location mechanism are included. In this situation the data is stripped by splitting every track (11) into as many "stripes" as many head arms (4) there are.

Alternative (not preferred) embodiment with two head arm sets is shown on FIG. 8. It may be easier to manufacture this embodiment because the arrangement of parts is similar to previous technology and makes use of otherwise unused space.

Alternative (preferred when space or shape is restricted) embodiment with four head arm sets is shown on FIG. 10. It may be easier to manufacture this embodiment because the arrangement of parts makes it possible to fit the disk drive system implementing this improvement into the prior-art casing (1). Although not having completely evenly angularly distributed head arms, this system does introduce significant speed improvements over prior-art systems. New, future, actuator assemblies may allow even head distribution even with this arrangement by, for example, using different casing (1) size and evenly positioning actuators (6) relative to each other.

In all "Multiple Read/Write Heads For Every Surface" embodiments, except if the embodiment also implements said "Immediate Fetching" improvement, the controller does not wait for the sector addressed by operation to "come" to a particular head set, but will perform the required operation using the head set that first encounters the said sector.

Mode 2—Independent Head Arms

Figure 11:
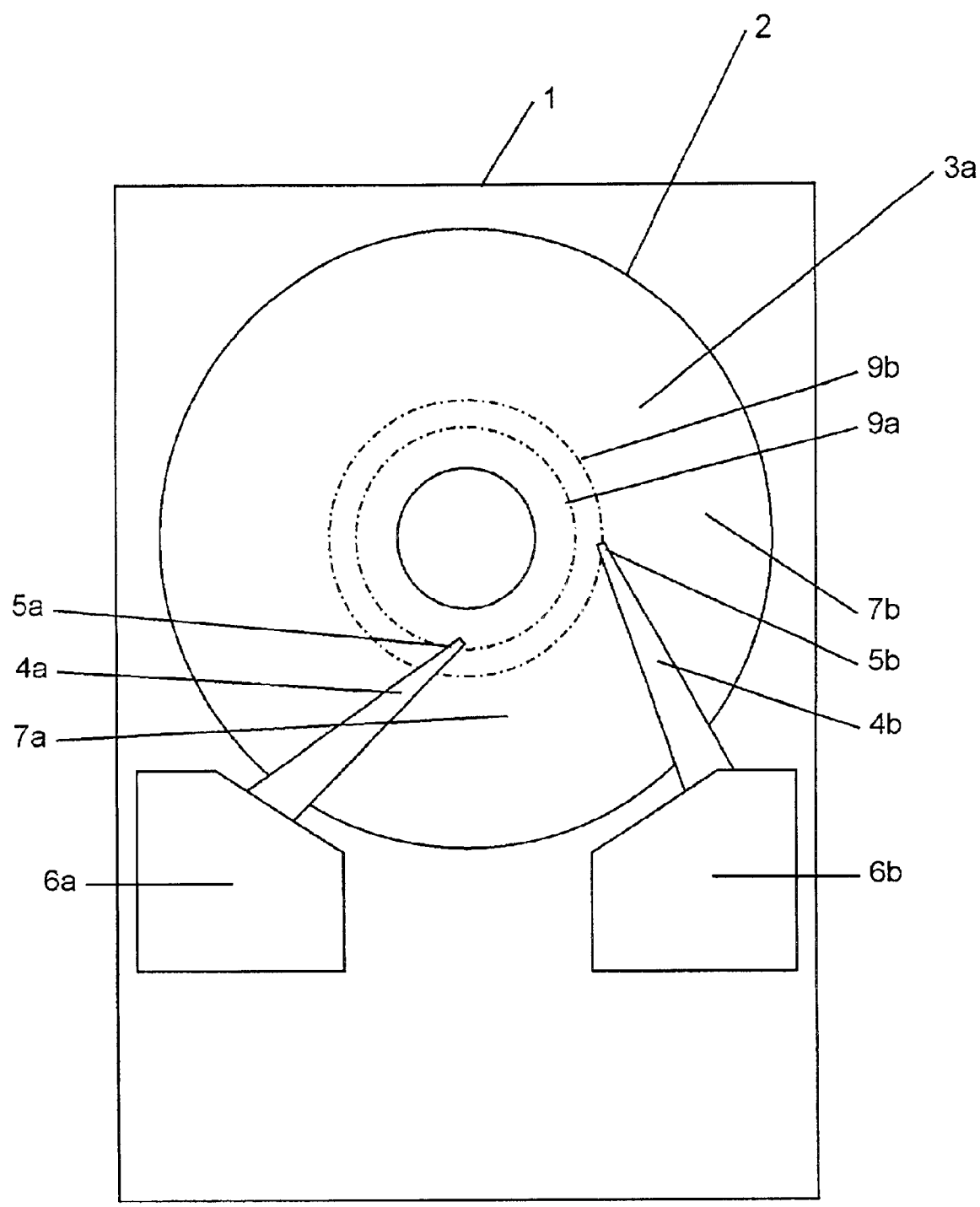
FIG. 11 shows one possible (not preferred) arrangement of improved disk drive system with two head arm (6a+4a and 6b+4b) sets that are not limited (by any to having all heads (5a and 5b) on the same cylinder. Dot-dashed circles (9a and 9b) indicate cylinders where the heads (5a and 5b) are currently on. The arcs with arrows on ends (7a and 7b) indicate the movement path of corresponding heads. The surrounding rectangle (1) indicates the approximate relative size of the casing of currently most common (prior-art) hard disk drive systems.
Figure 12:
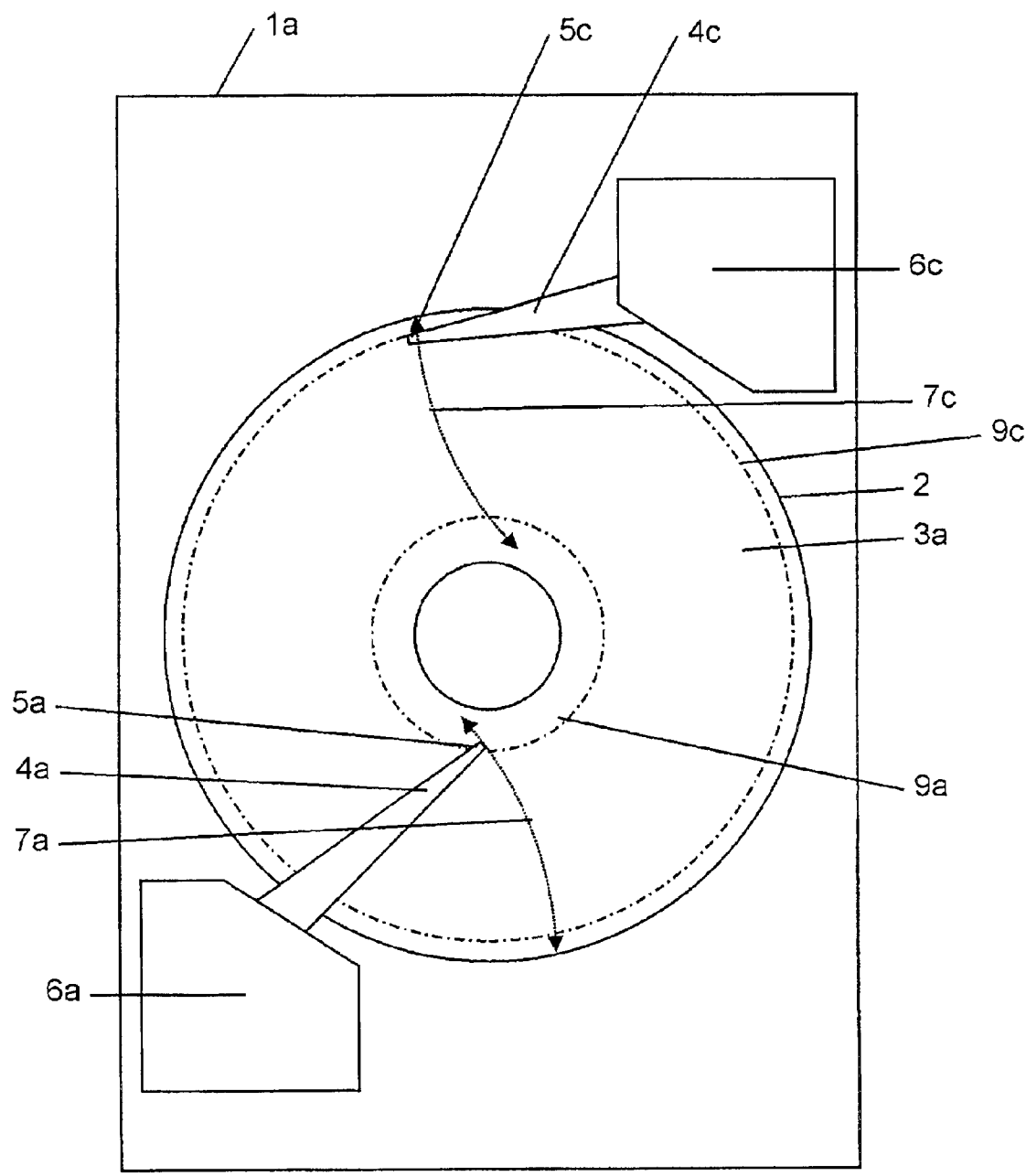
FIG. 12 shows a preferred arrangement of improved disk drive system with two head arm sets (6a+4a and 6c+4c) that are not limited (by any means) to having all heads (5a and 5c) on the same cylinder. Dot-dashed circles indicate radiuses (9a and 9c) where the heads are currently on. The arcs with arrows on ends (7a and 7c) indicate the movement path of corresponding heads (5a and 5c). The surrounding rectangle (1) indicates the approximate relative size of the casing of currently most common (prior-art) hard disk drive systems.
Figure 13:
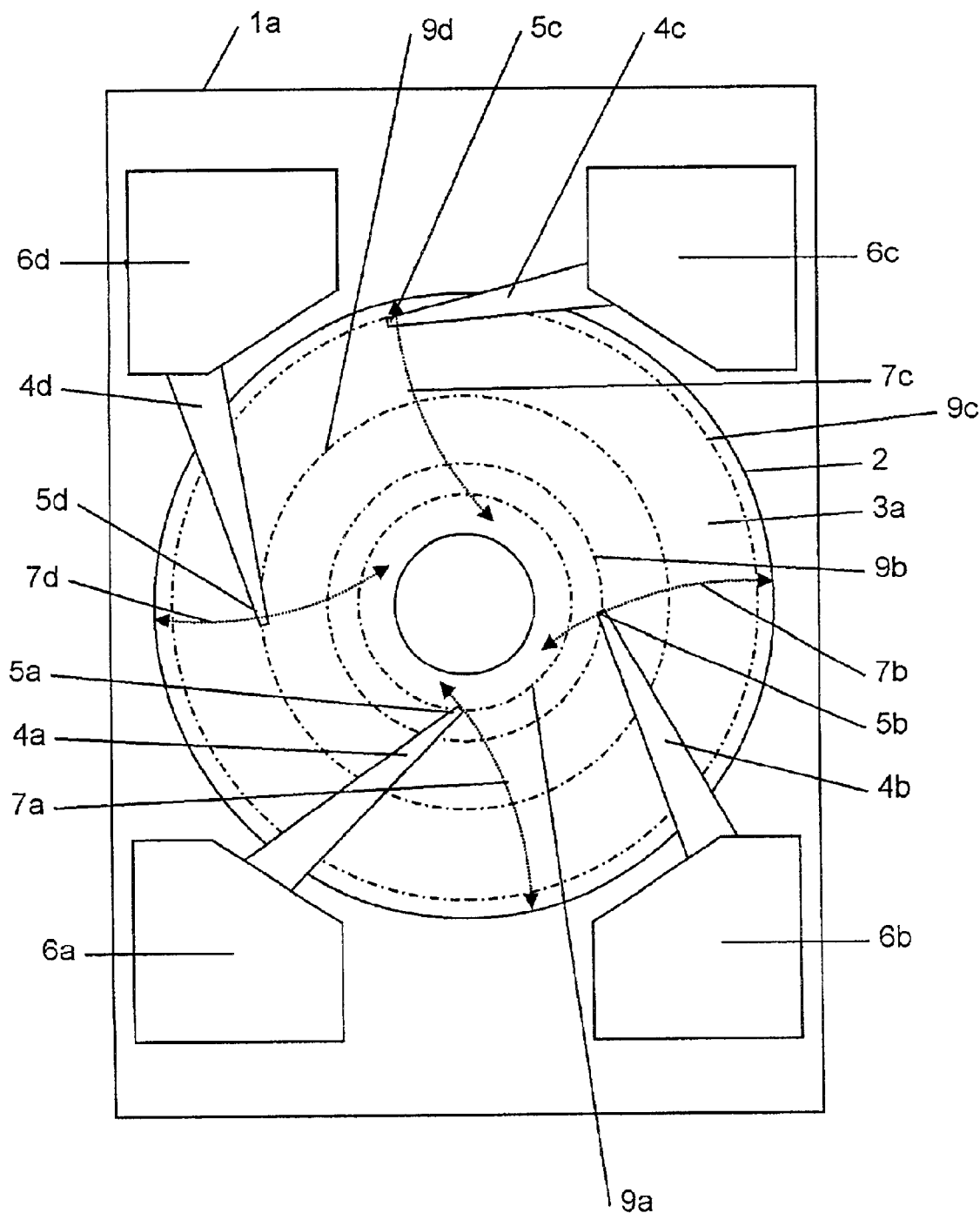
FIG. 13 shows a preferred arrangement of improved disk drive system with four head arm sets (6a+4a, 6b+4b, 6c+4c and 6d+4d) that are not limited (by any means) to having all heads (5a, 5b, 5c and 5d) on the same cylinder. Dot-dashed circles (9a, 9b, 9c and 9d) indicate cylinders where the heads (5a, 5b, 5c and 5d) are currently on. The arcs with arrows on ends (7a, 7b, 7c and 7d) show the head movement path. The surrounding rectangle (1) shows the real outer size of currently most common hard disk drive systems.
Figure 14:
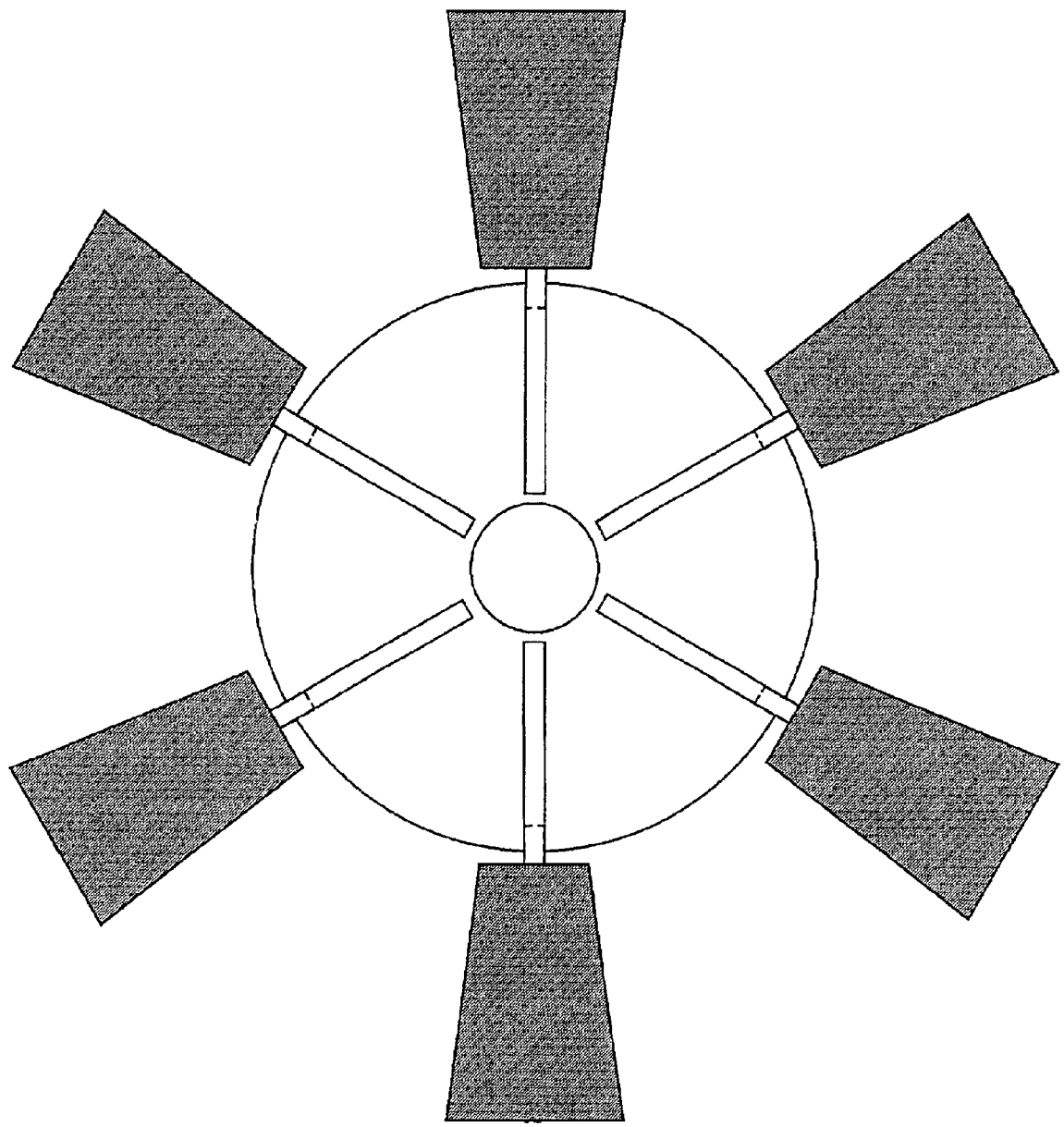
FIG. 14 shows a preferred arrangement of improved disk drive system with six linear-movement head arms. Mechanisms for moving head arms are shown shaded.
Figure 15:
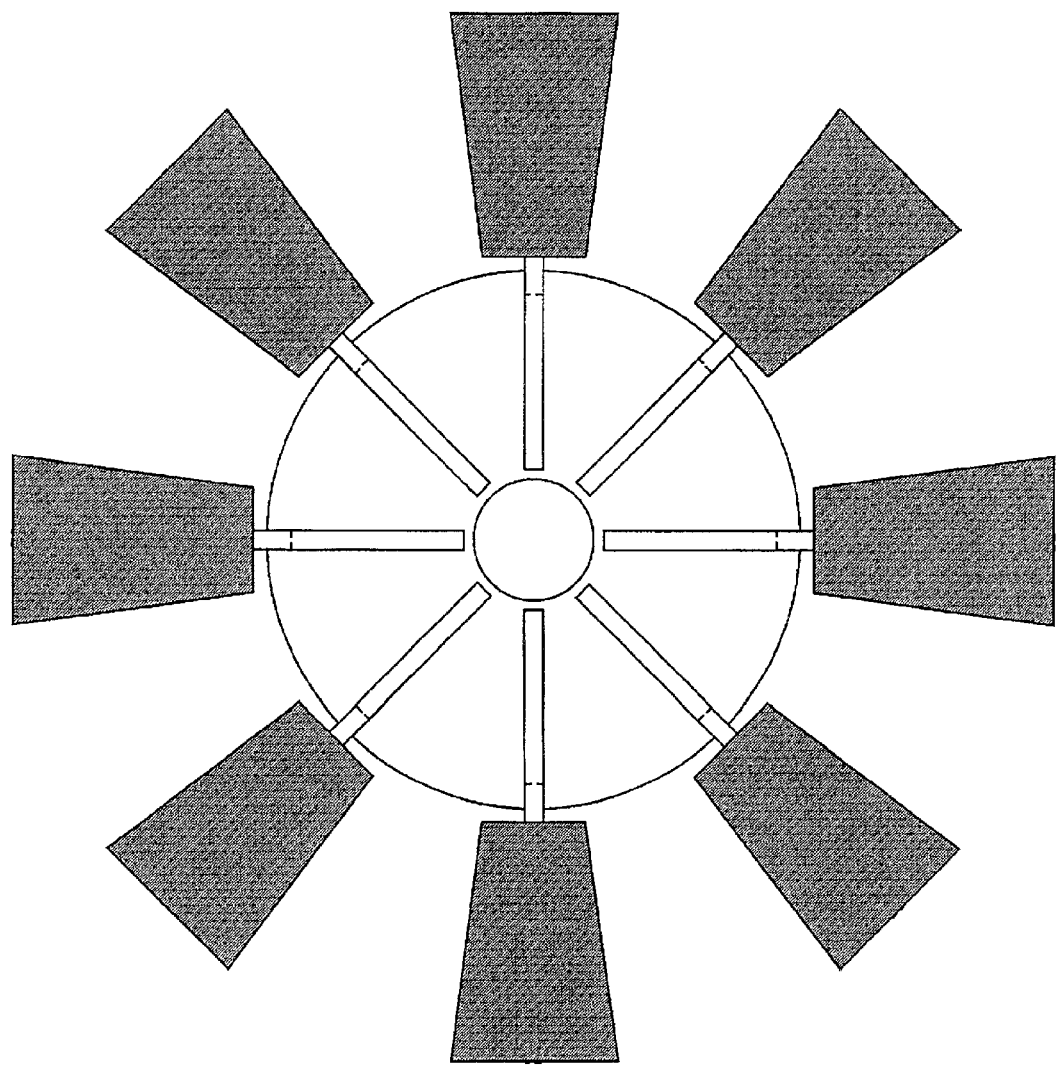
FIG. 15 shows a preferred arrangement of improved disk drive system with eight linear-movement head arms. Mechanisms for moving head arms are shown shaded.
Figure 16:
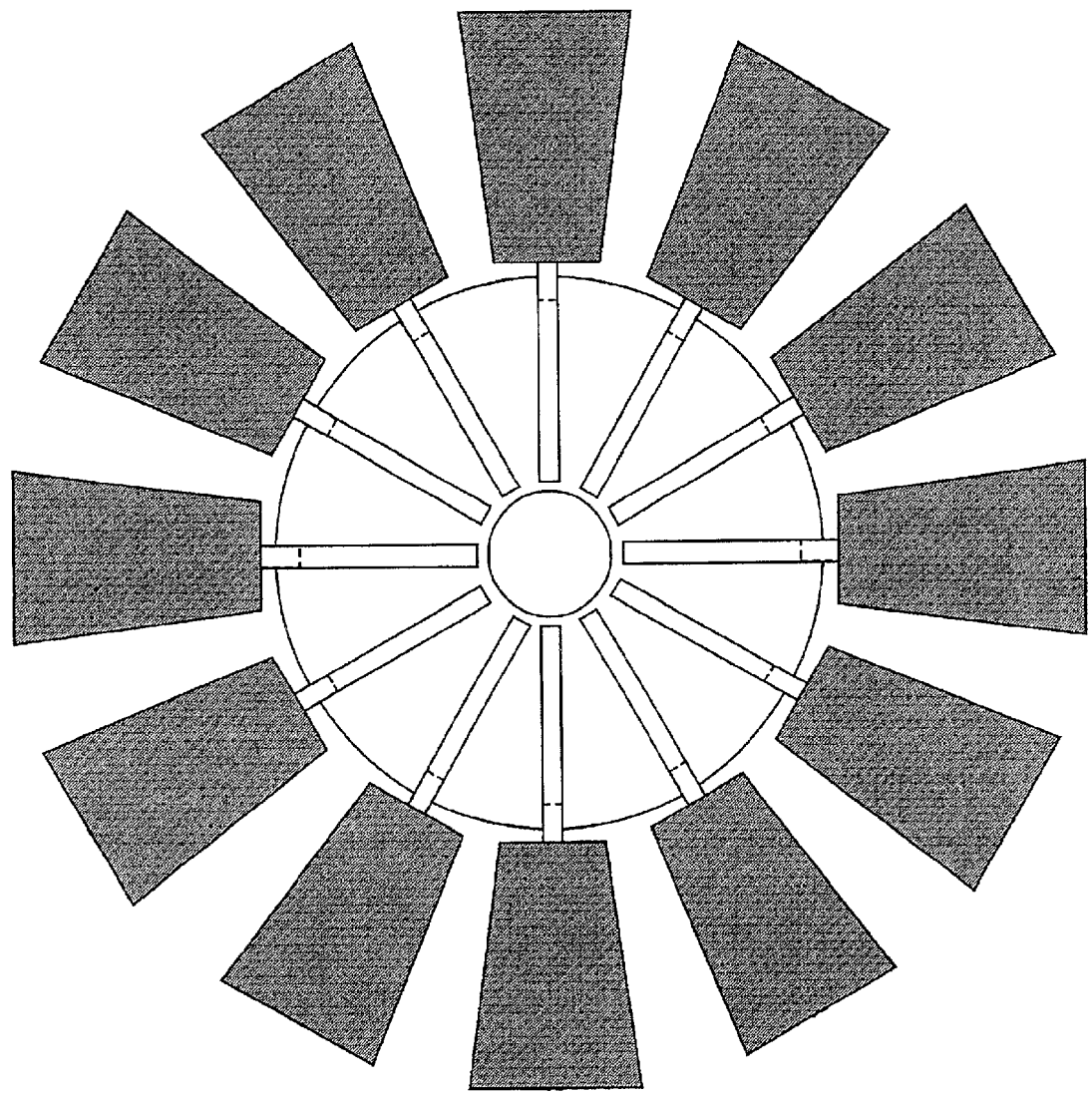
FIG. 16 shows a preferred arrangement of improved disk drive system with twelve linear-movement head arms. Mechanisms for moving head arms are shown shaded.

Having multiple independent head arms (4) [shown on FIGS. 11–13 and, alternatively 14–16] that can position their heads (5) on different cylinders (10) requires the most significant change to prior-art hard drive technology of all suggested in this invention. Beside mechanical modifications, it requires more intelligence to be built into the controller. Furthermore, larger cache buffer memories and more intelligent hard drive interfaces and protocols are recommended (see Command Queuing Improvement later in this document).

Aside from being able to approximately simulate "All Heads On Same Cylinder" improvement described above, it can make more intelligent use of the head arms by moving only the closest one and pre-positioning them before the reads and writes. It does not suffer of the backtracking problem described later in "Array Of Heads On Each Arm" system not having a separate head for every cylinder.

Short head arm movements are frequent in all applications and in many cases the some of the heads (5) may already be positioned as required. Depending on number of independent actuators and the intelligence of the controller, interface and the operating system the latency associated with head arm movement while reading or writing data may be reduced to zero in some situations.

Improvement of cylinder access speed can impact multi-stream multimedia applications, but it is more important to databases, file servers and swap (virtual memory) drives. Data transfer speed improvement over regular drives is variable and depends on current angular and radial distribution of heads (i.e. there is no direct data transfer improvement if the heads are not on the same cylinder). The theoretical maximum is the same as for the "All Heads On Same Cylinder" technology.

In the preferred embodiment of the "Independent Head Arms" embodiment of disk drive system, the heads (5) are evenly angularly distributed when on same cylinder [FIGS. 11–16], for the same reason described for the preferred "All Heads On Same Cylinder" embodiment.

Some of the possible modes of operation (movement of head arms) follow:

Optimized for long sequential reads/writes (multimedia A/V editing)—When the hard drive controller logic and/or software senses long sequential reads (or is given an explicit command) it can enter the mode in which it positions all the heads (5) on the same cylinder (10), simulating "All Heads On The Same Cylinder" technology with one improvement—heads (5) can advance to the next cylinder (10) at the same time, one by one or in groups, depending on angular offsets of sectors and required transfer speed and with a goal to minimize the total transfer time (including read/write and head arm movement times).

Random movement (database, file, Internet servers and VM drives)—When the hard drive senses short, random reads (or is given an explicit command) it can enter the mode in which it positions all the heads (5) evenly across the radius of the disks (or other such determined optimal positions). When a read or write operation needs to occur, only the nearest head is moved, to save time. When hard drive is idle, head arms can slowly be restored to their original positions. Depending on the profile statistics gathered and/or command queuing information stored the controller may, for example, choose not to move only the nearest head, but also to bring other heads closer to (but not onto) the addressed cylinder, expecting that following operations may occur in the vicinity of the current one.

Mode 3—One Head Per Surface Zone

A simplified version of "Independent Head Arms" embodiment can be preferred if the cost factor is more important than speed or available space limits the size of the device. In this situation, the preferred embodiment has independent head arms with movements limited to a single zone (16). For example, in a two heads per surface drive, one head arm would move its heads only across outer half of cylinders and the other one only across inner half of cylinders. The reduction of the length of the maximum stroke may impact the size, location, power consumption and speed of the head arm system, resulting in lower overall cost of the disk drive system. It is important to note that zones for head arm allocation does not need to be the same as the zones used to optimize linear data density by varying number of sectors.

Mode 4—Multiple Heads Per Surface Per Zone

In situations similar to what is described in "One Head Per Surface Zone" but when budget and the layout, size and shape of casing or space allow multiple heads per zone, an extension of "One Head Per Surface Zone" improvement can be made by multiplying the number of heads for some or for all zones. This situation is probable only in disk drive systems with linear head movement and with more than 3 heads per surface, but configurations with radial movement head arms are also possible. Possible arrangements are shown on FIG. 13 (angular head movement, 4 heads per surface) and FIGS. 14–16 (linear head movement).

Array Of Heads On Each Arm

In disk drive systems with linear head movement, having more than one head on each arm can reduce the length of the strokes of each head arm. When N such heads are evenly distributed the size of a full stroke is reduced N times. Such drives would have different speed performance characteristics and can be both faster and slower than disk drives constructed according to previous art. Reasons for the system being slower is the increased mass of the head arm assembly implying slower head arm movement speeds and necessary seeking required when moving from the last cylinder of one head zone to the first cylinder of the next one. Having multiple head arms having different, overlapping, head zone allocation can reduce the latter deficiency.

In a special case when there is a separate head for each cylinder (distributed on one or multiple arms) no arm movement is necessary with the exception of "parking" if it is required. Therefore, all head movement (seek) operations are removed and the time required to perform them is reduced to none. Although manufacturing of such head arrays themselves may be expensive, the mechanisms and the logic for moving them may be removed or simplified to only account for thermal or other run-time and natural deformations of disks.

This special case implies more speed improvement for random access applications and almost no improvement for sequential access applications. Such random access applications are databases, file servers, swap (virtual memory) drives and multi-stream audio and video editing with very large number of streams. When possible, this is the preferred embodiment for all such applications, especially when having multiple such head arms.

Having multiple heads on each radially moving head arms (4) is also possible but introduces other benefits and problems. Such systems would probably utilize just a few heads spanning a very short distance. This can be used to require less arm movements when near-to-current cylinders are to be addressed. However, this would significantly increase the mass of such head systems and the strain imposed on actuators.

Complete Per-Head Independence

Having completely indepdenent and unrestricted movement of each and every head separately requires many more indepentent actuators but also allows for many more modes of operation. These actuators do not have to have to be as powerful as regular ones because they would have to move only a single arm with a single head. They would, however, have to be significantly smaller to allow the most convinient assembly—to be stacked on top of each other.

Emodiment implementing complete head movement independence also require more electronics and may require the reorganization of servo information if it is used as it would no longer be able to be shared.

This embodiment eliminates the need for micro-positioning mechanism otherwise required to implement internal data stripping as complete independence is now available. Micro-positioning mechanism could, though, be used to possibly achieve better performance by having similar effect to reducing the head settling time (micro-positioning mechanism could counter-act oscillations and/or other temporary misalignments of head arm faster than actuator can do the same thing)

Depending on how many heads per surface does a particular implemented embodiment have it can emulate and further improve all the features of "Multiple Read/Write Heads Per Surface" improvement. Software that controls such embodiment would have to be more complex to effectively use the advantages of this system.

Command Queuing Improvement

Command Queuing and Command Reordering technologies can really start to flourish within the hard drives with multiple actuators. Their impact can is much more significant in such drives than in prior art drives using current technology. The Command Interface protocol needs to be improved to allow the operating systems to make use of new technology. Suggested improvements are:

"Multiple Command Queuing" should be achievable by a single client, not only by multiple clients.

The Command Interface should allow reordered and asynchronous read data transfers, dictated by the hard drive controller, to facilitate faster internal buffer flushing. Asynchronous read data transfer implies that the data will be sent back to the requestor once read but would not stop accepting new commands before that happens. Alternatively, the interface and/or protocol should support simultaneous two-way communication in any one of the following ways:

The interface supports only one host (only one client at a time) and supports two-way communication only with that single host.

The interface supports multiple clients within the host system, but is capable of sending the information only to those clients not sending any data to the disk drive themselves (idle clients).

The interface supports multiple clients within the host system and is capable of sending the information to any of those clients regardless of whether said clients are idle or not.

New Command Interface protocol commands should be added to allow the operating system to give suggested profile information to hard drives. With this information hard drive controllers would be able to better utilize the new technologies.

New Command Interface protocol may include features similar to "contracts" found in ATM Networking technology, allowing the operating system to better prioritize and reorganize hard drive operation requests and hard drive to better understand incoming requests in multitasking operating systems, where multiple separate operation streams may be taking place at the same time.

Summary of Implications

General Implications

Internal stripping may have an effect on servo information organization and requires separate fine-positioning mechanism for each head.

With multiple actuators (6) with total freedom, any kind of head failure (including thermal asperity) has less impact because there may be other heads that could access (read or write) the same data. The failure can be communicated to the host, suggesting backup and drive replacement on time, before the data is lost due to failing heads.

If a single actuator (6), head arm (4) or head (5) fails, and others are present, the data is still accessible.

With the system being capable of internal stripping and reading/writing data from/to multiple data surfaces (3) at the same time, the data can be structured in a way to contain more control information (i.e. parity surfaces or distributed parity blocks/zones), allowing complete surfaces to fail but still keep the capability to read and write data until the drive is replaced, similarly to what RAID 3–7 can accomplish externally, but without the write operation performance impact. This slightly reduces the drive capacity, though, and is therefore more useful for drives with more surfaces (disks).

With multiple actuators (6), the verification of data just written can be faster since it does not require full revolution after write operation to perform the verification operation The processing power of controller must be significantly increased.

The command/communication interfaces must be improved to allow higher speeds. With current drive technology and all the improvements applied, the data transfer speeds required for new interface would be around and at approximately 1 Gigabyte per second (5 to 10 times faster than currently available prior-art standard interfaces such as ATA and SCSI).

New command interface protocols should be developed to provide the drive with more relevant information about what is going to be done so that hard drive can prepare itself in advance for the upcoming operations and perform them faster. Good examples of this are operating system boot-up, playing one or many long multimedia files at one time . . .

Data transfer speeds may reach burst rates of up to approx. 30 times what would be achievable with prior art technology (with 4 disks, 4 actuator arms, immediate fetching and internal stripping innovations, and everything else kept unmodified). This means smaller and faster database servers and many more streams of audio/video being possible without any glitches even when data is heavily fragmented. Much better virtual memory performance that can be experienced by users with little main memory or power users operating with big random-access files (such as high-resolution large-format photographs, large temporary files, etc)

Additional disk drive system cooling may be required. (more circuitry and mechanics will dissipate more thermal energy)

Disk drives may require bigger (longer) casing/housing (to fit more controller circuitry and additional mechanical parts such as additional actuators and cooling systems)

Operating systems improvement is desirable (e.g. top better facilitate command queuing to chain more read/write requests at once and let the drive decide about the ordering) although not necessary.

Improved cost/performance value of the disk drive system although the cost of the system would be higher, the performance improvements would be much more significant.

Prior-art technologies can be used to build all necessary components except firmware and possibly few other parts because all suggested improvements are based on data reorganization and multiplication of specific components of a disk drive system. This reduces the time required to start producing new disk drive models implementing the improvements suggested by this invention.

Speed Implications

Approximate maximum speed improvements for a drive with S data surfaces and N heads per surface:
[t2]
Approximate maximum performance improvement with:

| Application | Fetching | Internal Stripping | Multiple heads per surface | All Combined |
|---|---|---|---|---|
| Multimedia (Sequential Access) | 1 × (none) | S × | N × | SN × |
| Database, VM, . . . (Random Access) | approx. 2 × | approx. S/2 × | approx. N × | approx. SN × |

Example approximate maximum speed improvements for a drive with 3 data surfaces (1 of 4 reserved for servo control information) and 2 heads per surface:
[t1]
Approximate maximum performance improvement with:

| Application | Fetching | Internal Stripping | Multiple heads per surface | All Combined |
|---|---|---|---|---|
| Multimedia (Sequential Access) | 1 × (none) | 3 × | 2 × | 6 × |
| Database, VM, . . . (Random Access) | approx. 2 × | approx. 1.5 × | approx. 2 × | approx. 6 × |

Example approximate maximum speed improvements for a drive with 5 data surfaces (1 of 6 reserved for servo control information) and 4 heads per surface:
[t3]
Approximate maximum performance improvement with:

| Application | Fetching | Internal Stripping | Multiple heads per surface | All Combined |
|---|---|---|---|---|
| Multimedia (Sequential Access) | 1 × (none) | 5 × | 4 × | 20 × |
| Database, VM, . . . (Random Access) | approx. 2 × | approx. 2.5 × | approx. 4 × | approx. 20 × |

Example approximate maximum speed improvements for a drive with 8 data surfaces and 4 heads per surface:
[t4]
Approximate maximum performance improvement with:

| Application | Fetching | Internal Stripping | Multiple heads per surface | All Combined |
|---|---|---|---|---|
| Multimedia (Sequential Access) | 1 × (none) | 8 × | 4 × | 32 × |
| Database, VM, . . . (Random Access) | approx. 2 × | approx. 4 × | approx. 4 × | approx. 32 × |

What is claimed is:

1. A disk data storage device comprising of:
one or more disks for storing data having track widths lesser than three times the maximum possible disk deformation in any direction,
one or more actuators driving one or more head arms for each used surface,
wherein at least two surfaces are used for storing any type of data,
wherein each arm has a piezo-electric crystal-based fine head positioning system comprised of one or more such crystals to which heads are attached either directly or indirectly, such as via a lever, wherein the said crystals are controllably deformable to move the head in desired direction and distance,
wherein the said fine head positioning system can move heads distant and precise enough to be able compensate for said deformations of disk material, deformations of actuator arm and deformations or production imprecision of any present components affecting relative positioning between the disks and heads or heads relative to one another,
wherein the each of the said fine head positioning systems is independently controllable such that heads fitted on them can be independently moved into independent directions such that all the heads on the same common actuator can be aligned on the same cylinder while maintaining the independence of heads on separate head arm actuators, wherein any or all of the heads available per surface can be used to read or write data on that surface, therefore having the ability to access data on any surface having at least one operational head for that surface, logic and/or circuitry controlling all available head arm actuators and all independent fine head positioning systems wherein this logic positions all the heads on the cylinder designated for each head arm during a seek operation and maintains this position on that cylinder until a new position is needed for heads on that particular arm, logic and/or circuitry capable of reading data from all (read) heads simultaneously and capable of writing data using all (write) heads simultaneously or being able to otherwise simultaneously use all heads for read and write operations, a communications interface through which the commands, responses and other data being read, written and/or otherwise important is being transmitted, and logic and/or circuitry controlling the entire device and capable of caching intermediate data, reading data recorded ahead of time in anticipation of it being requested and planning strategies of future operations, wherein this logic exposes the linear sector addressing mode not requiring the host to handle particular physical geometry of disks and recorded data.

2. A disk data storage device of claim 1, wherein the recorded data is organized in such a way that two or more consecutive (sequential) logical sectors can be read or written at the same time, using different heads, whether the heads are on the same actuator arm or a plurality of available actuator arms, or both.

3. A disk data storage device of claim 1, wherein the logical sectors can be divided into two or more physical sectors that can be read or written at the same time, using different heads, whether the heads are on the same actuator arm or a plurality of available actuator arms, or both.

4. A disk data storage device of claim 1, wherein the data is physically recorded in such a way that data required to recover data stored in any physical sector not readable by one head, can be accessed by other available heads at the same time when the said inaccessible physical sector is passing under the head that cannot access it, whether the heads used to access the recovery information are located on the same or different actuator arms and whatever the cause is for the sector to be inaccessible, such as but not limited to head or surface damage.

5. A disk data storage device of claim 1, wherein the fine head positioning system is capable of placing some heads of any single actuator arm on one cylinder and remaining heads of the same actuator arm on another, neighbouring cylinder such that different surfaces of said two cylinders can be accessed simultaneously using different heads of any single actuator arm.

6. A disk data storage device of claim 1 with a plurality of heads for each surface driven by independent actuators and wherein the communications interface is capable of simultaneously sending the data read by any subset of all available heads to the host and receiving commands and/or data to write by using another, non-overlapping subset of all available heads and being capable of executing the multiplicity of reads and writes simultaneously, using different heads.

7. A disk data storage device of claim 1 capable of multiplicity of different recorded data organizations affecting maximum sustained data transfer rates, latencies and access times, among which the host system can choose to best suit its maximum communication speed and usage profile.

8. A disk data storage device of claim has enough internal buffer memory to store more than one entire cylinder worth of data and has read-ahead pre-buffering logic implemented to fetch the data from a plurality of heads simultaneously immediately after completing any seek operation without waiting or skipping sectors coming before the sector addressed by the operation requiring a seek, if any, or waiting for any other heads to complete any outstanding operation whatsoever, including seek.

9. A disk data storage device of claim 1 capable of sending data to the host out of order and fetching and transmitting the requested data out of order from a plurality of heads simultaneously immediately after completing any seek operation without waiting or skipping sectors that are not first or next in line to be fetched.

10. A disk data storage device of claim 1 capable of receiving data to be written from the host at data transfer rates higher than maximum data recording rates, having an internal buffer to store this data and then record it in a different order than received to internally optimize the moving of all available actuators and fine head positioning systems.

11. A disk data storage device of claim 1 capable of:

recognizing increasing discrepancies between readings of the same recorded data being read by a multiplicity of heads available on the same surface, therefore indicating a likely head failure, or detecting errors with all heads available for the surface, therefore indicating a likely surface or recorded data damage, automatically attempting to test the likely surface or recorded data damage by automatically recovering and re-recording the data and reading it again, automatically moving heads to test and attempt to repair different parts of recorded data at times the device is otherwise idle and not required by the host to perform operations, and automatically notifying the host of any detected errors as a device initiated event, without requiring the host to request the error reports.

* * * * *